US012787007B2

(12) United States Patent
Su et al.

(10) Patent No.: US 12,787,007 B2
(45) Date of Patent: Nov. 3, 2026

(54) COMMUNICATION METHOD, APPARATUS, AND SYSTEM

(71) Applicant: HUAWEI TECHNOLOGIES CO., LTD., Shenzhen (CN)

(72) Inventors: Tong Su, Shenzhen (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 726 days.

(21) Appl. No.: 18/160,699

(22) Filed: Jan. 27, 2023

(65) Prior Publication Data

US 2023/0171782 A1 Jun. 1, 2023

Related U.S. Application Data

(63) Continuation of application No. PCT/CN2021/107510, filed on Jul. 21, 2021.

(30) Foreign Application Priority Data

Jul. 30, 2020 (CN) ......................... 202010753140.1
Jul. 5, 2021 (CN) ......................... 202110759154.9

(51) Int. Cl.
*H04W 72/21* (2023.01)
*H04L 5/00* (2006.01)

(52) U.S. Cl.
CPC ........... *H04W 72/21* (2023.01); *H04L 5/0055* (2013.01)

(58) Field of Classification Search
None
See application file for complete search history.

(56) References Cited

U.S. PATENT DOCUMENTS

2013/0229906 A1 9/2013 Akkarakaran et al.
2016/0072567 A1 3/2016 Kim et al.
(Continued)

FOREIGN PATENT DOCUMENTS

CN 102771173 A 11/2012
CN 103503525 A 1/2014
(Continued)

OTHER PUBLICATIONS

Moderator Oppo, "Email discussion summary for [96e] [115] NR_RF_FR2_req_enh_Part_1," 3GPP TSG-RAN WG4 Meeting # 96e, R4-2011855, Aug. 17-28, 2020, 38 pages.
(Continued)

*Primary Examiner* — Pao Sinkantarakorn
*Assistant Examiner* — Luis Guillermo Lema Lemos
(74) *Attorney, Agent, or Firm* — Fish & Richardson P.C.

(57) ABSTRACT

Embodiments of this application provide a communication method, apparatus, and system. In an example method, in response to determining that a first condition is met, a terminal device determines a target physical uplink control channel (PUCCH) resource, and sends an acknowledgment codebook to a network device on the target PUCCH resource. The first condition includes: a first PUCCH resource overlaps a second PUCCH resource, or a first PUCCH resource and a second PUCCH resource are in a same time unit. The first PUCCH resource carries first feedback information corresponding to first downlink data. The first feedback information includes first negative acknowledgement (NACK) information of the first downlink data but does not include first positive acknowledgement (ACK) information.

20 Claims, 9 Drawing Sheets

(56) References Cited

U.S. PATENT DOCUMENTS

| | | | | |
|---|---|---|---|---|
| 2020/0145144 | A1* | 5/2020 | Hosseini | H04W 76/27 |
| 2021/0014647 | A1* | 1/2021 | Takeda | H04W 72/21 |
| 2021/0314104 | A1* | 10/2021 | Yin | H04W 72/21 |
| 2022/0248395 | A1* | 8/2022 | Andersson | H04W 72/0446 |
| 2022/0264563 | A1 | 8/2022 | Choi et al. | |

FOREIGN PATENT DOCUMENTS

| | | | | |
|---|---|---|---|---|
| CN | 110536397 | A | 12/2019 | |
| CN | 111262668 | A | 6/2020 | |
| WO | 2020136854 | A1 | 7/2020 | |
| WO | WO-2020145704 | A1 * | 7/2020 | H04W 72/21 |

OTHER PUBLICATIONS

3GPP TS 38.213 V16.2.0, "3rd Generation Partnership Project; Technical Specification Group Radio Access Network; NR; Physical layer procedures for control (Release 16)," Jun. 2020, 176 pages.
3GPP TS 38.214 V16.2.0, "3rd Generation Partnership Project; Technical Specification Group Radio Access Network; NR; Physical layer procedures for data (Release 16)," Jun. 2020, 163 pages.
International Search Report and Written Opinion in International Appln. No. PCT/CN2021/107510, mailed on Oct. 20, 2021, 15 pages (with English translation).
Vivo, "Remaining issues on mode 1 resource allocation mechanism," 3GPP TSG RAN WG1 #101, R1-2003378, e-Meeting, May 25-Jun. 5, 2020, 16 pages.
Office Action in Indian Appln. No. 202327006502, mailed on Sep. 1, 2023, 8 pages (with English translation.
Extended European Search Report in European Appln No. 21850515.4, dated Nov. 6, 2023, 11 pages.
Panasonic, "On multi-TRP enhancements for NR MIMO in Rel. 16," 3GPP TSG RAN WG1 #97, R1-1907031, Reno, USA, May 13-17, 2019, 16 pages.
EP Communication Pursuant to Article 94(3) EPC in European Appln. No. 21850515.4, mailed on Apr. 16, 2026, 9 pages.

* cited by examiner

COMMUNICATION METHOD, APPARATUS, AND SYSTEM

CROSS-REFERENCE TO RELATED APPLICATIONS

This application is a continuation of International Application No. PCT/CN2021/107510, filed on Jul. 21, 2021, which claims priority to Chinese Patent Application No. 202010753140.1, filed on Jul. 30, 2020, and Chinese Patent Application No. 202110759154.9, filed on Jul. 5, 2021. The disclosures of the aforementioned applications are hereby incorporated by reference in their entireties.

TECHNICAL FIELD

Embodiments of this application relate to the communication field, and in particular, to a communication method, apparatus, and system.

BACKGROUND

In 5G new radio (new radio, NR), for user equipment (user equipment, UE) in a connected state, a groupcast scheduling mode instead of a broadcast scheduling mode may be used, together with the introduction of hybrid automatic repeat request (hybrid automatic repeat request, HARQ) mechanism, to improve transmission efficiency. For example, in downlink data transmission, UE sends feedback information to a base station after receiving a physical downlink shared channel (physical downlink shared channel, PDSCH). If the physical downlink shared channel is correctly received, the UE feeds back acknowledgment (acknowledgment, ACK) information on a physical uplink control channel (physical uplink control channel, PUCCH). If the physical downlink shared channel is not correctly received, the UE feeds back negative acknowledgment (negative acknowledgment, NACK) information on the PUCCH.

Currently, for a single UE, the base station may receive both feedback information of a unicast service and feedback information of a groupcast service. The UE sends an ACK/NACK sequence on the PUCCH when only the feedback information corresponding to the groupcast service exists at a feedback moment of the groupcast service. The UE sends an ACK/NACK sequence on the PUCCH when only the feedback information corresponding to the unicast service exists at a feedback moment of the unicast service.

However, feedback conflict occurs when the feedback moment of the groupcast service and the feedback moment of the unicast service are a same moment.

SUMMARY

Embodiments of this application provide a communication method, apparatus, and system, to resolve conflict between a feedback moment of a unicast service and a feedback moment of a groupcast service.

A first aspect of embodiments of this application provides a communication method. The method may be performed by a terminal device, or may be performed by a component (for example, a processor, a chip, or a chip system) of the terminal device. The method includes: The terminal device receives first downlink data and at least one piece of second downlink data from a network device. The terminal device determines a target physical uplink control channel PUCCH resource when a first condition is met. The first condition includes: A first PUCCH resource overlaps a second PUCCH resource, a first PUCCH resource and a second PUCCH resource are in a same time unit, or first feedback information corresponding to the first downlink data and at least one piece of second feedback information corresponding to the at least one piece of second downlink data are in a same time unit. The first PUCCH resource carries the first feedback information corresponding to the first downlink data. The first feedback information includes first negative acknowledgment NACK information of the first downlink data but does not include first positive acknowledgment ACK information. The first NACK information indicates that the terminal device does not correctly receive the first downlink data, and the first ACK information indicates that the terminal device correctly receives the first downlink data. The second PUCCH resource carries the at least one piece of second feedback information corresponding to the at least one piece of second downlink data. Each piece of second feedback information includes second NACK information or second ACK information. Each piece of second NACK information indicates that the terminal device does not correctly receive one of the at least one piece of second downlink data. Each piece of second ACK information indicates that the terminal device correctly receives one of the at least one piece of second downlink data. The terminal device sends an acknowledgment codebook to the network device on the target PUCCH resource. The acknowledgment codebook includes third feedback information corresponding to the first downlink data and the at least one piece of second feedback information. The third feedback information includes the first NACK information or the first ACK information.

In this embodiment of this application, when the first condition is met, the terminal device determines the target PUCCH resource, and sends the acknowledgment codebook to the network device on the target PUCCH resource. The first condition includes: The first PUCCH resource overlaps the second PUCCH resource, or the first PUCCH resource and the second PUCCH resource are in a same time unit. The first PUCCH resource carries the first feedback information corresponding to the first downlink data, and the first feedback information includes the first NACK information of the first downlink data but does not include the first ACK information. That the terminal device sends the acknowledgment codebook has the following advantages. This effectively resolves feedback conflict caused when the first PUCCH resource overlaps the second PUCCH resource, when the first PUCCH resource and the second PUCCH resource are in a same time unit, or when the first feedback information and the at least one piece of second feedback information are in a same time unit. In addition, the acknowledgment codebook includes the third feedback information and the second feedback information. This avoids inconsistency between a size of an acknowledgment codebook that is determined by the network device in the case in which the acknowledgment codebook includes the first feedback information and the second feedback information and a size of the acknowledgment codebook that is actually fed back by the terminal device. In this way, feedback determined by the network device is consistent with actual feedback of the terminal device.

Optionally, in a possible implementation of the first aspect, the foregoing step further includes: When a second condition is met, the terminal device determines to send the at least one piece of second feedback information on the second PUCCH resource. The second condition includes: The first PUCCH resource does not overlap the second PUCCH resource, or the first PUCCH resource and the second PUCCH resource are not in a same time unit. Optionally, the first feedback information and the at least one piece of second feedback information are in a same time unit, and the first feedback information and the at least one piece of second feedback information have different priorities. The first PUCCH carries the first feedback information, and the second PUCCH carries the at least one piece of second feedback information.

Optionally, in a possible implementation of the first aspect, the foregoing step further includes: When the second condition is met and the terminal device does not correctly receive the first downlink data, the terminal device determines to send the first feedback information on the first PUCCH resource. The first feedback information is the first NACK information.

In this possible implementation, when the second condition is met and the terminal device does not correctly receive the first downlink data, the terminal device feeds back only the first NACK information on the first PUCCH resource. This avoids resource occupation caused by sending the first ACK information for a plurality of times, and saves uplink resources.

Optionally, in a possible implementation of the first aspect, the foregoing step further includes: When the second condition is met and the terminal device correctly receives the first downlink data, the terminal device determines not to send the first ACK information.

In this possible implementation, when the second condition is met and the terminal device correctly receives the first downlink data, the terminal device does not send the feedback information on the first PUCCH resource. This avoids resource occupation caused by sending the first ACK information for a plurality of times, and saves uplink resources.

Optionally, in a possible implementation of the first aspect, the foregoing step further includes: When the first condition is met and the terminal device does not correctly receive the first downlink data, the acknowledgment codebook includes the first NACK information and the at least one piece of second feedback information.

In this possible implementation, when the first condition is met and the terminal device does not correctly receive the first downlink data, the terminal device sends, on the target PUCCH resource, the acknowledgment codebook combining the third feedback information and the second feedback information. This avoids conflict between a feedback moment of the first downlink data and a feedback moment of the second downlink data.

Optionally, in a possible implementation of the first aspect, the foregoing step further includes: When the first condition is met and the terminal device correctly receives the first downlink data, the acknowledgment codebook includes the first ACK information and the at least one piece of second feedback information.

In this possible implementation, when the first condition is met and the terminal device correctly receives the first downlink data, the terminal device sends, on the target PUCCH resource, the acknowledgment codebook combining the third feedback information and the second feedback information. This avoids conflict between a feedback moment of the first downlink data and a feedback moment of the second downlink data.

Optionally, in a possible implementation of the first aspect, the target PUCCH resource in the foregoing step is the same as the second PUCCH resource.

In this possible implementation, the target PUCCH resource is the second PUCCH resource. This reduces a delay caused by determining the target PUCCH resource, saves resource configurations, and the like.

Optionally, in a possible implementation of the first aspect, the foregoing step further includes: The terminal device receives first indication information, where the first indication information indicates the first PUCCH resource; and/or the terminal device receives second indication information, where the second indication information indicates the second PUCCH resource.

In this possible implementation, the PUCCH resource is indicated using indication information, so that the network device and the terminal device can quickly determine a PUCCH resource used for sending or receiving data. This improves transmission efficiency.

Optionally, in a possible implementation of the first aspect, the first condition specifically includes: The first feedback information and the at least one piece of second feedback information are in a same time unit, and the first feedback information and the at least one piece of second feedback information have a same priority.

A second aspect of embodiments of this application provides a communication method. The method may be performed by a network device, or may be performed by a component (for example, a processor, a chip, or a chip system) of the network device. The method includes: The network device sends first downlink data and at least one piece of second downlink data from to a terminal device. The network device determines a target physical uplink control channel PUCCH resource when a first condition is met. The first condition includes: A first PUCCH resource overlaps a second PUCCH resource, a first PUCCH resource and a second PUCCH resource are in a same time unit, or first feedback information corresponding to the first downlink data and at least one piece of second feedback information corresponding to the at least one piece of second downlink data are in a same time unit. The first PUCCH resource carries the first feedback information corresponding to the first downlink data. The first feedback information includes first negative acknowledgment NACK information of the first downlink data but does not include first positive acknowledgment ACK information. The first NACK information indicates that the terminal device does not correctly receive the first downlink data, and the first ACK information indicates that the terminal device correctly receives the first downlink data. The second PUCCH resource carries the at least one piece of second feedback information corresponding to the at least one piece of second downlink data. Each piece of second feedback information includes second NACK information or second ACK information. Each piece of second NACK information indicates that the terminal device does not correctly receive one of the at least one piece of second downlink data. Each piece of second ACK information indicates that the terminal device correctly receives one of the at least one piece of second downlink data. The network device receives, on the target PUCCH resource, an acknowledgment codebook sent by the terminal device. The acknowledgment codebook includes third feedback information corresponding to the first downlink data and the at least one piece of second feedback information. The third feedback information includes the first NACK information or the first ACK information.

In this embodiment of this application, when the first condition is met, the network device determines the target PUCCH resource, and receives, on the target PUCCH resource, the acknowledgment codebook that is sent by the terminal device and that combines the feedback information corresponding to the first downlink data and the feedback information corresponding to the second downlink data. This effectively resolves feedback conflict caused when the first PUCCH resource overlaps the second PUCCH resource or the first PUCCH resource and the second PUCCH resource are in a same time unit.

Optionally, in a possible implementation of the second aspect, the foregoing step further includes: When a second condition is met, determining to receive the at least one piece of second feedback information on the second PUCCH resource. The second condition includes: The first PUCCH resource does not overlap the second PUCCH resource, or the first PUCCH resource and the second PUCCH resource are not in a same time unit. Optionally, the first feedback information and the at least one piece of second feedback information are in a same time unit, and the first feedback information and the at least one piece of second feedback information have different priorities. The first PUCCH carries the first feedback information, and the second PUCCH carries the at least one piece of second feedback information.

Optionally, in a possible implementation of the second aspect, the foregoing step further includes: The network device receives the first feedback information on the first PUCCH resource. The first feedback information is the first NACK information.

In this possible implementation, the network device learns, by receiving the first NACK information, that the terminal device does not correctly receive the first downlink data.

Optionally, in a possible implementation of the second aspect, the foregoing step further includes: If the network device does not receive the first NACK information sent by the terminal device, the network device determines that the terminal device has correctly received the first downlink data.

In this possible implementation, when the network device does not receive the first NACK information, the network device determines that the terminal device has correctly received the first downlink data. This avoids resource consumption caused by transmission of the first ACK information.

Optionally, in a possible implementation of the second aspect, the acknowledgment codebook in the foregoing step includes the first NACK information and the at least one piece of second feedback information.

In this possible implementation, the network device receives the acknowledgment codebook combining feedback information corresponding to the first downlink data and feedback information corresponding to the second downlink data. This effectively resolves feedback conflict caused when the first PUCCH resource overlaps the second PUCCH resource or the first PUCCH resource and the second PUCCH resource are in a same time unit.

Optionally, in a possible implementation of the second aspect, the acknowledgment codebook in the foregoing step includes the first ACK information and the at least one piece of second feedback information.

In this possible implementation, the network device receives the acknowledgment codebook combining feedback information corresponding to the first downlink data and feedback information corresponding to the second downlink data. This effectively resolves feedback conflict caused when the first PUCCH resource overlaps the second PUCCH resource or the first PUCCH resource and the second PUCCH resource are in a same time unit.

Optionally, in a possible implementation of the second aspect, the target PUCCH resource in the foregoing step is the same as the second PUCCH resource.

In this possible implementation, the target PUCCH resource is the second PUCCH resource. This reduces a delay caused by determining the target PUCCH resource, saves resource configurations, and the like.

Optionally, in a possible implementation of the second aspect, the foregoing step further includes: The network device sends first indication information to the terminal device, where the first indication information indicates the first PUCCH resource; and/or the network device sends second indication information to the terminal device, where the second indication information indicates the second PUCCH resource.

In this possible implementation, the PUCCH resource is indicated using indication information, so that the network device and the terminal device can quickly determine a PUCCH resource used for sending or receiving data. This improves transmission efficiency.

Optionally, in a possible implementation of the second aspect, the first condition specifically includes: The first feedback information and the at least one piece of second feedback information are in a same time unit, and the first feedback information and the at least one piece of second feedback information have a same priority.

A third aspect of embodiments of this application provides a communication apparatus. The communication apparatus may be a terminal device, or may be a component (for example, a processor, a chip, or a chip system) of the terminal device. The communication apparatus includes:

- a transceiver unit, configured to receive first downlink data and at least one piece of second downlink data from a network device; and
- a processing unit, configured to determine a target physical uplink control channel PUCCH resource when a first condition is met. The first condition includes: A first PUCCH resource overlaps a second PUCCH resource, a first PUCCH resource and a second PUCCH resource are in a same time unit, or first feedback information corresponding to the first downlink data and at least one piece of second feedback information corresponding to the at least one piece of second downlink data are in a same time unit.

The first PUCCH resource carries the first feedback information corresponding to the first downlink data. The first feedback information includes first negative acknowledgment NACK information of the first downlink data but does not include first positive acknowledgment ACK information. The first NACK information indicates that the first downlink data is not correctly received, and the first ACK information indicates that the first downlink data is correctly received. The second PUCCH resource carries the at least one piece of second feedback information corresponding to the at least one piece of second downlink data. Each piece of second feedback information includes second NACK information or second ACK information. Each piece of second NACK information indicates that one of the at least one piece of second downlink data is not correctly received. Each piece of second ACK information indicates that one of the at least one piece of second downlink data is correctly received.

The transceiver unit is further configured to send an acknowledgment codebook to the network device on the target PUCCH resource. The acknowledgment codebook includes third feedback information corresponding to the first downlink data and the at least one piece of second feedback information. The third feedback information includes the first NACK information or the first ACK information.

Optionally, in a possible implementation of the third aspect, the processing unit of the communication apparatus is further configured to: when a second condition is met, determine to send the at least one piece of second feedback information on the second PUCCH resource. The second condition includes: The first PUCCH resource does not overlap the second PUCCH resource, or the first PUCCH resource and the second PUCCH resource are not in a same time unit. Optionally, the first feedback information and the at least one piece of second feedback information are in a same time unit, and the first feedback information and the at least one piece of second feedback information have different priorities. The first PUCCH carries the first feedback information, and the second PUCCH carries the at least one piece of second feedback information.

Optionally, in a possible implementation of the third aspect, when the second condition is met and the first downlink data is not correctly received, the processing unit of the communication apparatus is further configured to determine to send the first feedback information on the first PUCCH resource. The first feedback information is the first NACK information.

Optionally, in a possible implementation of the third aspect, when the second condition is met and the first downlink data is correctly received, the communication apparatus determines not to send the first ACK information.

Optionally, in a possible implementation of the third aspect, when the first condition is met and the first downlink data is not correctly received, the acknowledgment codebook includes the first NACK information and the at least one piece of second feedback information.

Optionally, in a possible implementation of the third aspect, when the first condition is met and the first downlink data is correctly received, the acknowledgment codebook includes the first ACK information and the at least one piece of second feedback information.

Optionally, in a possible implementation of the third aspect, the target PUCCH resource is the same as the second PUCCH resource.

Optionally, in a possible implementation of the third aspect, the transceiver unit of the communication apparatus is further configured to receive first indication information from the network device, where the first indication information indicates the first PUCCH resource; and/or the transceiver unit is further configured to receive second indication information from the network device, where the second indication information indicates the second PUCCH resource.

Optionally, in a possible implementation of the third aspect, the first condition specifically includes: The first feedback information and the at least one piece of second feedback information are in a same time unit, and the first feedback information and the at least one piece of second feedback information have a same priority.

A fourth aspect of embodiments of this application provides a communication apparatus. The communication apparatus may be a network device, or may be a component (for example, a processor, a chip, or a chip system) of the network device. The communication apparatus includes:

- a transceiver unit, configured to send first downlink data and at least one piece of second downlink data to a terminal device; and
- a processing unit, configured to determine a target physical uplink control channel PUCCH resource when a first condition is met. The first condition includes: A first PUCCH resource overlaps a second PUCCH resource, a first PUCCH resource and a second PUCCH resource are in a same time unit, or first feedback information corresponding to the first downlink data and at least one piece of second feedback information corresponding to the at least one piece of second downlink data are in a same time unit.

The first PUCCH resource carries the first feedback information corresponding to the first downlink data. The first feedback information includes first negative acknowledgment NACK information of the first downlink data but does not include first positive acknowledgment ACK information. The first NACK information indicates that the terminal device does not correctly receive the first downlink data, and the first ACK information indicates that the terminal device correctly receives the first downlink data. The second PUCCH resource carries the at least one piece of second feedback information corresponding to the at least one piece of second downlink data. Each piece of second feedback information includes second NACK information or second ACK information. Each piece of second NACK information indicates that the terminal device does not correctly receive one of the at least one piece of second downlink data. Each piece of second ACK information indicates that the terminal device correctly receives one of the at least one piece of second downlink data.

The transceiver unit is further configured to receive an acknowledgment codebook on the target PUCCH resource. The acknowledgment codebook includes third feedback information corresponding to the first downlink data and the at least one piece of second feedback information. The third feedback information includes the first NACK information or the first ACK information.

Optionally, in a possible implementation of the fourth aspect, the processing unit of the communication apparatus is further configured to: when a second condition is met, determine to receive the at least one piece of second feedback information on the second PUCCH resource. The second condition includes: The first PUCCH resource does not overlap the second PUCCH resource, or the first PUCCH resource and the second PUCCH resource are not in a same time unit. Optionally, the first feedback information and the at least one piece of second feedback information are in a same time unit, and the first feedback information and the at least one piece of second feedback information have different priorities. The first PUCCH carries the first feedback information, and the second PUCCH carries the at least one piece of second feedback information.

Optionally, in a possible implementation of the fourth aspect, the transceiver unit of the communication apparatus is further configured to receive the first feedback information on the first PUCCH resource. The first feedback information is the first NACK information.

Optionally, in a possible implementation of the fourth aspect, the processing unit of the communication apparatus is further configured to: if the transceiver unit does not receive the first NACK information sent by the terminal device, determine that the terminal device has correctly received the first downlink data.

Optionally, in a possible implementation of the fourth aspect, the acknowledgment codebook includes the first NACK information and the at least one piece of second feedback information.

Optionally, in a possible implementation of the fourth aspect, the acknowledgment codebook includes the first ACK information and the at least one piece of second feedback information.

Optionally, in a possible implementation of the fourth aspect, the target PUCCH resource is the same as the second PUCCH resource.

Optionally, in a possible implementation of the fourth aspect, the transceiver unit of the communication apparatus is further configured to send first indication information to the terminal device, where the first indication information indicates the first PUCCH resource; and/or the transceiver unit is further configured to send second indication information to the terminal device, where the second indication information indicates the second PUCCH resource.

Optionally, in a possible implementation of the fourth aspect, the first condition specifically includes: The first feedback information and the at least one piece of second feedback information are in a same time unit, and the first feedback information and the at least one piece of second feedback information have a same priority.

A fifth aspect of embodiments of this application provides a communication apparatus. The communication apparatus may be a terminal device, or may be a component (for example, a processor, a chip, or a chip system) of the terminal device. The communication apparatus performs the method in any one of the first aspect or the possible implementations of the first aspect.

A sixth aspect of embodiments of this application provides a communication apparatus. The communication apparatus may be a network device, or may be a component (for example, a processor, a chip, or a chip system) of the network device. The communication apparatus performs the method in any one of the second aspect or the possible implementations of the second aspect.

A seventh aspect of embodiments of this application provides a computer-readable storage medium. The computer-readable storage medium stores instructions. When the instructions are executed on a computer, the computer is enabled to perform the method in any one of the first aspect or the possible implementations of the first aspect, or any one of the second aspect or the possible implementations of the second aspect.

An eighth aspect of embodiments of this application provides a computer program product. When the computer program product runs on a computer, the computer is enabled to perform the method in any one of the first aspect or the possible implementations of the first aspect, or any one of the second aspect or the possible implementations of the second aspect.

A ninth aspect of embodiments of this application provides a communication apparatus, including a processor. The processor is coupled to a memory, and the memory is configured to store a program or instructions. When the program or the instructions are executed by the processor, the apparatus is enabled to implement the method in any one of the first aspect or the possible implementations of the first aspect.

A tenth aspect of embodiments of this application provides a communication apparatus, including a processor. The processor is coupled to a memory, and the memory is configured to store a program or instructions. When the program or the instructions are executed by the processor, the apparatus is enabled to implement the method in any one of the second aspect or the possible implementations of the second aspect.

An eleventh aspect of embodiments of this application provides a communication system, including the communication apparatus provided in the third aspect, the fifth aspect, or the ninth aspect, and the communication apparatus provided in the fourth aspect, the sixth aspect, or the tenth aspect.

For technical effects brought by any one of the third aspect, the fifth aspect, the seventh aspect, the eighth aspect, and the ninth aspect, or the possible implementations thereof, refer to the technical effects brought by the first aspect or the different possible implementations of the first aspect. Details are not described herein again.

For technical effects brought by any one of the fourth aspect, the sixth aspect, the seventh aspect, the eighth aspect, and the tenth aspect, or the possible implementations thereof, refer to the technical effects brought by the second aspect or the different possible implementations of the second aspect. Details are not described herein again.

DESCRIPTION OF EMBODIMENTS

Embodiments of this application provide a communication method, apparatus, and system, to effectively resolve conflict between feedback moments of feedback information corresponding to a plurality of pieces of downlink data.

The following clearly describes the technical solutions in embodiments of this application with reference to the accompanying drawings in embodiments of this application. It is clear that, the described embodiments are merely some but not all of the embodiments of this application.

Figure 1:
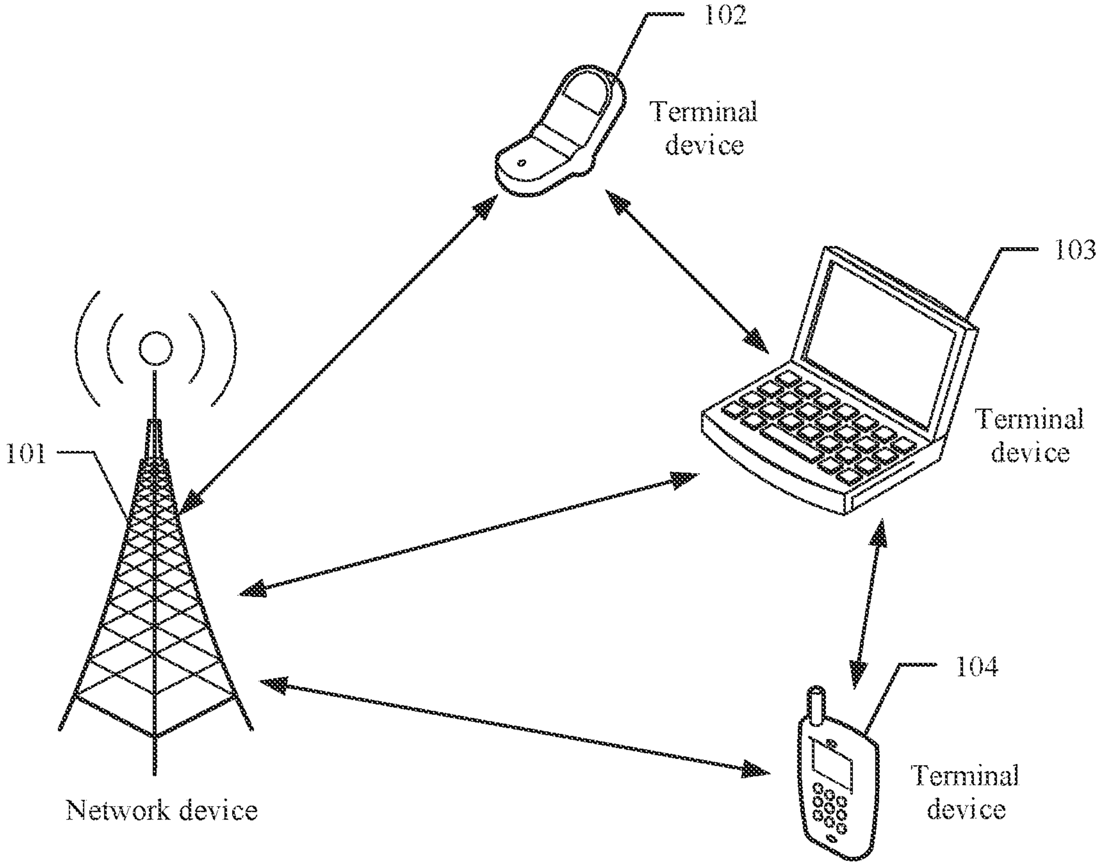
FIG. 1 is a schematic diagram of a network framework according to an embodiment of this application.

FIG. 1 is a schematic diagram of a communication system. The communication system may include a network device 101 and terminal devices 102 to 104 connected to the network device 101.

In embodiments of this application, only one network device 101 and three terminal devices 102 to 104 are used as an example for description. In actual application, the communication system in embodiments of this application may include more network devices 101 and terminal devices 102, and there may be one or more terminal devices 102. A quantity of network devices 101 and a quantity of terminal devices 102 are not limited in embodiments of this application.

The network device 101 in embodiments of this application may be any device having a wireless sending/receiving function. The network device includes but is not limited to:

a base station (for example, a base transceiver station (base transceiver station, BTS) in a universal mobile telecommunications system (Universal Mobile Telecommunications System, UMTS), an evolved NodeB (evolved NodeB, eNB) in a long term evolution (Long Term Evolution, LTE) system, a base station in a fifth generation communication system, a base station in a future communication system), a remote radio unit (remote radio unit, RRU), a wireless relay node, a wireless backhaul node, a transmission reception point (transmission reception point, TRP), a wireless controller in a cloud radio access network (cloud radio access network, CRAN) scenario, or an access point (Access Point, AP) of another communication system such as Wireless Fidelity (Wireless Fidelity, Wi-Fi). This is not specifically limited herein.

The terminal devices 102 to 104 in embodiments of this application may be a device that provides voice and/or data connectivity for users, a handheld device having a radio connection function, or another processing device connected to a radio modem. The terminal device may be deployed on land, including an indoor device, an outdoor device, a handheld device, or a vehicle-mounted device; or may be deployed on a water surface (such as a ship); or may be deployed in air (for example, on an airplane, a balloon, or a satellite). The terminal device may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a vehicle-mounted terminal device, a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), a wearable terminal device, or the like. An application scenario is not limited in embodiments of this application. The terminal device sometimes may also be referred to as a terminal, user equipment (user equipment, UE), an access terminal device, a vehicle-mounted terminal, an industrial control terminal, a UE unit, a UE station, a mobile station, a remote station, a remote terminal device, a mobile device, a UE agent, a UE apparatus, or the like. The terminal device may be fixed or mobile.

In embodiments of this application, only an example in which the network device is a base station and the terminal device is UE is used for description.

In a communication system (for example, an NR system), the UE may be in a radio resource control-connected (radio resource control-connected, RRC-connected) state, a radio resource control-idle (radio resource control-idle, RRC-idle) state, or a radio resource control-inactive (radio resource control-inactive, RRC-inactive) state.

When the UE is in the RRC-connected state, there is an RRC connection between the UE and the base station. In this case, the base station knows that the UE is within a coverage area of the base station or within a management area of the base station. For example, the base station knows that the UE is within a coverage area of a cell managed by the base station. A core network knows a coverage area or a management area of a specific base station within which the UE is located, and the core network knows a specific base station through which the UE can be positioned or found. The base station and the UE may transmit data channels and/or control channels, to transmit unicast information of the UE. For example, the base station may send a physical downlink control channel (physical downlink control channel, PDCCH) and/or a PDSCH to the UE. For another example, the UE may send a physical uplink shared channel (physical uplink shared channel, PUSCH) and/or a PUCCH to the base station.

When the UE is in the RRC-idle state, there is no RRC connection between the UE and the base station. In this case, the base station does not know whether the UE is within the coverage area of the base station or within the management area of the base station. For example, the base station does not know whether the UE is within a coverage area of a cell managed by the base station. The core network does not know a coverage area or a management area of a specific base station within which the UE is located, and the core network does not know a specific base station through which the UE can be positioned or found. The UE may receive one or more of the following messages from the base station: a paging message, a synchronization signal, a broadcast message, or system information. In this case, the UE cannot perform unicast data transmission with the base station.

When the UE is in the RRC-inactive state, the base station does not know whether the UE is within the coverage area of the base station or within the management area of the base station. For example, the base station does not know whether the UE is within a coverage area of a cell managed by the base station. The core network does not know a specific base station through which the UE can be positioned or found. The UE may receive one or more of the following messages from the base station: a paging message, a synchronization signal, a broadcast message, or system information.

For UE in the RRC-connected state, the base station may use a groupcast scheduling mode instead of a broadcast scheduling mode. The base station may deliver a data service to the UE in a groupcast or unicast transmission mode.

The base station allocates a cell-radio network temporary identifier (cell-radio network temporary identifier, C-RNTI) to the UE, and the UE receives data based on downlink control information (downlink control information, DCI) scrambled using the C-RNTI. Such one-to-one data transmission is unicast transmission. If a plurality of UEs receive a same data service, the base station allocates a same group-radio network temporary identifier (Group-radio network temporary identifier, G-RNTI) to the UEs, and different UEs may receive the same data service based on DCI scrambled using the same G-RNTI. Such one-to-many data transmission is groupcast transmission. For a single UE, the base station may allocate a C-RNTI to the UE to receive a unicast service, or may allocate a G-RNTI to the UE to receive a groupcast service. The following uses only an example in which unicast downlink data is scrambled/descrambled using a C-RNTI and groupcast downlink data is scrambled/descrambled using a G-RNTI for description. In actual application, a scrambling/descrambling manner of unicast downlink data or groupcast downlink data is not limited herein.

In 5G NR, for the UE in the connected state, the groupcast scheduling mode instead of the broadcast scheduling mode may be used, together with the introduction of an HARQ feedback mechanism, to improve transmission efficiency of downlink data. For example, in downlink transmission, after the UE receives the PDSCH, the UE feeds back ACK information on the PUCCH if the PDSCH is received correctly; or the UE feeds back NACK information on the PUCCH if the PDSCH is received incorrectly. A time-domain location of the PUCCH on which the ACK information or the NACK information is fed back is indicated by DCI. When the UE transmits the ACK information or the NACK information on the PUCCH, the UE needs to first determine a PUCCH resource set including a plurality of PUCCH resources, and determine a PUCCH resource from the PUCCH resource set to transmit the ACK information or the NACK information.

To save uplink resources, the NACK information may be fed back only when the groupcast service is received incorrectly, and the ACK information is not fed back when the groupcast service is received correctly. However, when a feedback moment of the groupcast service and a feedback moment of another service are a same moment, whether the groupcast service is correctly received affects a size of an acknowledgment codebook formed by feedback information of a unicast service and feedback information of the groupcast service. Consequently, a size of the acknowledgment codebook fed back by the UE that is determined by the base station based on conventional technologies is different from a size of the acknowledgment codebook that is actually fed back by the UE, and feedback of the UE that is determined by the base station is inconsistent with actual feedback of the UE.

For example, when a feedback moment of groupcast data 1 and a feedback moment of unicast data 1 are a same moment, based on the conventional technologies, it is assumed that the groupcast data 1 is correctly received, and a size of an acknowledgment codebook combining feedback information of the groupcast data 1 and feedback information of the unicast data 1 is 1 bit. It is assumed that the groupcast data 1 is incorrectly received. A size of the acknowledgment codebook combining the feedback information of the groupcast data 1 and the feedback information of the unicast data 1 is 2 bits. A size of the acknowledgment codebook that is actually fed back by the terminal device may be 1 bit or 2 bits, which may be different from a size of the acknowledgment codebook fed back by the UE that is determined by the base station based on the conventional technologies, resulting in inconsistency between feedback of the UE that is determined by the base station and actual feedback of the UE.

In addition, the UE sends an ACK/NACK sequence on the PUCCH when only the feedback information corresponding to the groupcast service exists at the feedback moment of the groupcast service. The UE sends an ACK/NACK sequence on the PUCCH when only the feedback information corresponding to the unicast service exists at the feedback moment of the unicast service. However, feedback conflict occurs when the feedback moment of the groupcast service and the feedback moment of the unicast service are a same moment.

In view of this, embodiments of this application provide a communication method. The following describes the communication method in embodiments of this application.

Figure 2:
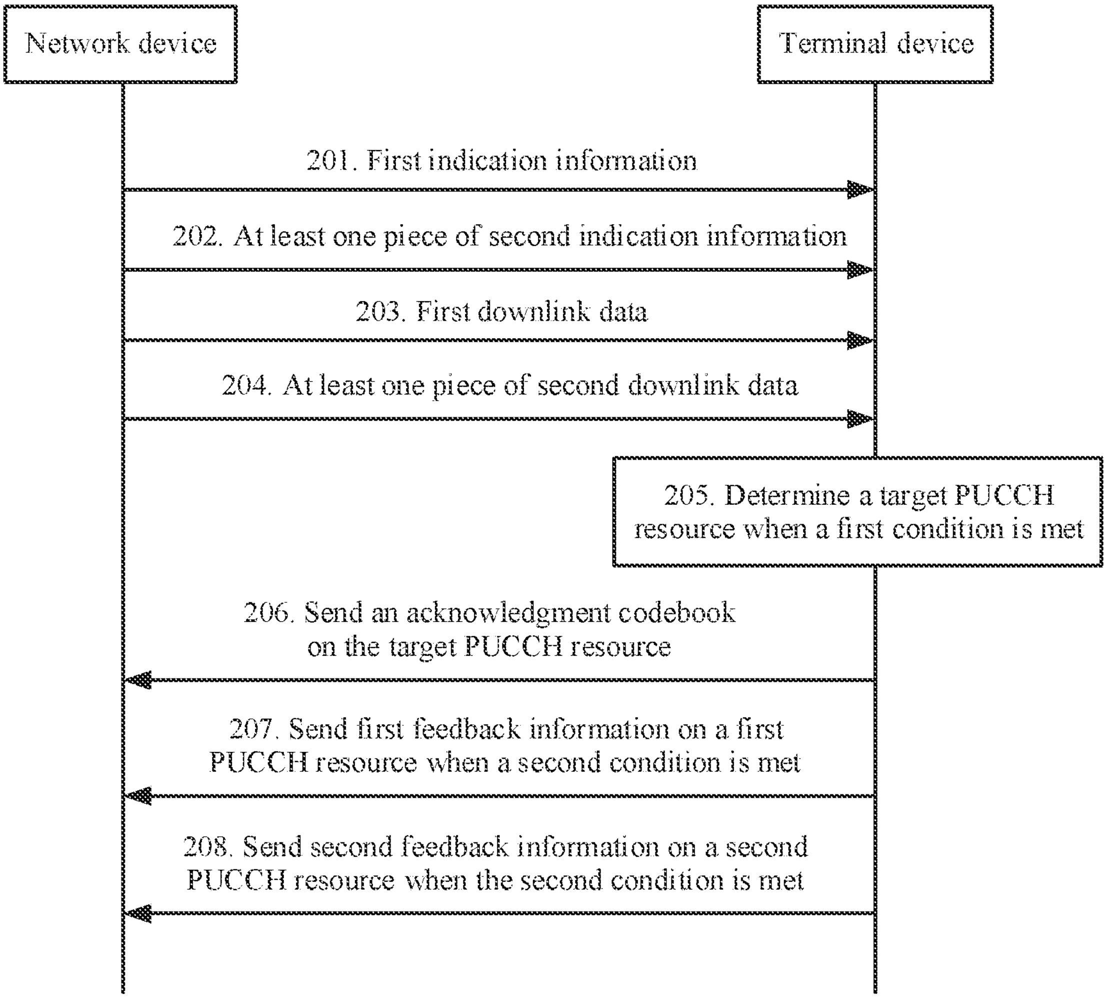
FIG. 2 is a schematic flowchart of a communication method according to an embodiment of this application.

Refer to FIG. 2. An embodiment of the communication method in embodiments of this application includes the following steps.

201. A network device sends first indication information to a terminal device. Correspondingly, the terminal device receives the first indication information.

There are a plurality of cases for the first indication information in this embodiment of this application. The following separately describes the cases.

Case 1: The first indication information is downlink control information DCI.

The network device sends first DCI to the terminal device, where the first DCI indicates a time-frequency resource for receiving service data by the terminal device, and further indicates a first PUCCH resource for sending first feedback information by the terminal device. The first feedback information is feedback information corresponding to first downlink data.

Figure 3:
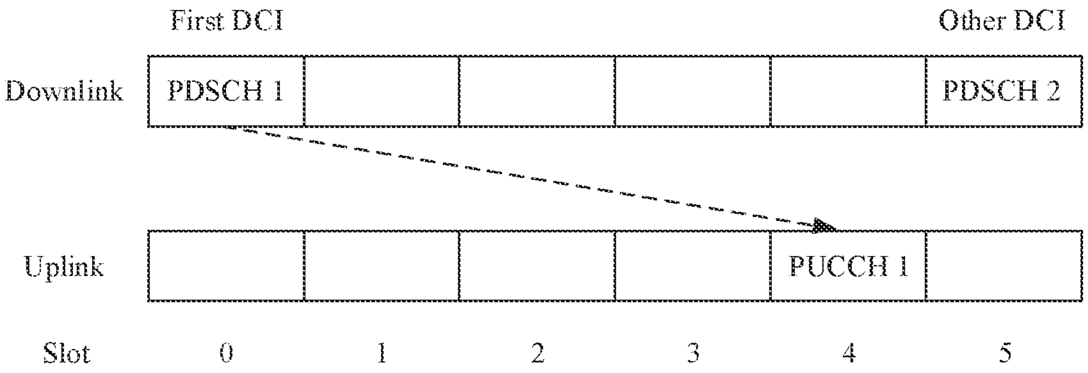
FIG. 3 is a schematic diagram of first DCI according to an embodiment of this application.

For example, as shown in FIG. 3, the first DCI indicates the terminal device to receive, in a downlink slot 0, the first downlink data carried on a PDSCH 1, and indicates the terminal device to send, to the network device in an uplink slot 4, the first feedback information corresponding to the first downlink data. The first feedback information is carried on the PUCCH 1.

Case 2: The first indication information is semi-persistent scheduling (semi-persistent scheduling, SPS) information.

The network device configures, via an RRC message, a first semi-persistent scheduling parameter related to the terminal device, such as a semi-persistent transmission time interval, a semi-persistent scheduling group radio network temporary identifier (SPS-G-RNTI), and a first PUCCH resource. The first PUCCH resource carries the first feedback information sent by the terminal device to the network device, and the first feedback information corresponds to the first downlink data. If the terminal device identifies that the first indication information is the semi-persistent scheduling information, the terminal device stores current indication information or scheduling information, and sends or receives service data at a same time-frequency resource location at every fixed time interval.

Optionally, the first downlink data is groupcast downlink data, the first DCI may also be referred to as groupcast DCI, and the groupcast DCI may be scrambled using an SPS-G-RNTI.

There are many manners of the first indication information in this embodiment of this application. The foregoing two manners are merely examples. This is not specifically limited herein.

The first feedback information in this embodiment of this application includes first NACK information of the first downlink data, but does not include first ACK information. The first NACK information indicates that the terminal device does not correctly receive the first downlink data. The first ACK information indicates that the terminal device correctly receives the first downlink data. This is equivalent to that the terminal device does not need to send the first ACK information to the network device if the terminal device correctly receives the first downlink data, and that the terminal device sends the first NACK information to the network device if the terminal device does not correctly receive the first downlink data.

202. The network device sends at least one piece of second indication information to the terminal device. Correspondingly, the terminal device receives the at least one piece of second indication information.

There are a plurality of cases for the second indication information in this embodiment of this application. The following separately describes the cases.

Case 1: The second indication information is downlink control information DCI.

The network device sends second DCI to the terminal device, where the second DCI indicates a second PUCCH resource for sending second feedback information corresponding to second downlink data by the terminal device.

There may be one or more pieces of second downlink data and second feedback information in this embodiment of this application, and each piece of second downlink data corresponds to one piece of second feedback information.

Optionally, the second downlink data is unicast downlink data or groupcast downlink data. When the second downlink data is unicast downlink data, the second DCI may also be referred to as unicast DCI, and the unicast DCI may be scrambled using a C-RNTI. When the second downlink data is groupcast downlink data, the second DCI may also be referred to as groupcast DCI, and the groupcast DCI may be scrambled using a G-RNTI.

Figure 4:
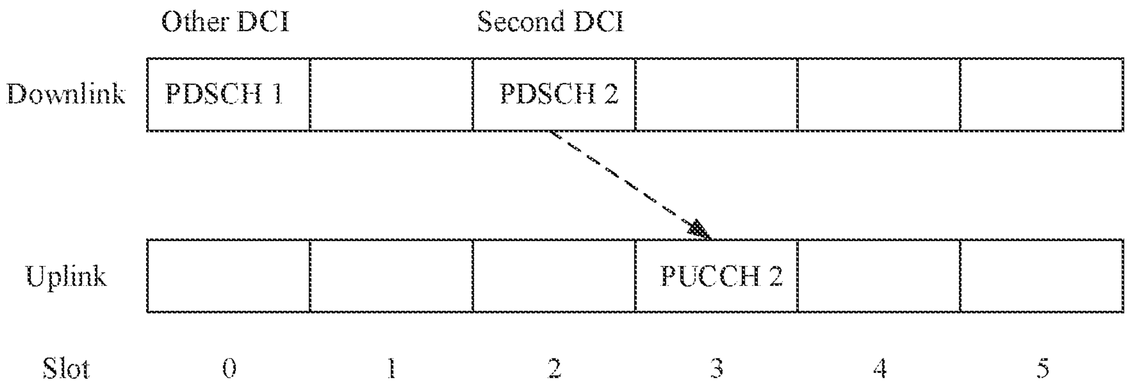
FIG. 4 is a schematic diagram of second DCI according to an embodiment of this application.

For example, as shown in FIG. 4, the second DCI indicates the terminal device to receive, in a downlink slot 2, the second downlink data carried on a PDSCH 2, and indicates the terminal device to send, to the network device in an uplink slot 3, the second feedback information corresponding to the second downlink data. The second feedback information is carried on the PUCCH 2. Other DCI may be the first DCI, or may be DCI other than the first DCI and the second DCI. This is not limited herein.

Case 2: The second indication information is SPS information.

The network device configures, via an RRC message, a second semi-persistent scheduling parameter related to the terminal device, such as a semi-persistent transmission time interval, a semi-persistent scheduling cell radio network temporary identifier (SPS-C-RNTI), and a second PUCCH resource. The second PUCCH resource carries the second feedback information sent by the terminal device to the network device, and the second feedback information corresponds to the second downlink data. If the terminal device identifies that the second indication information is the semi-persistent scheduling information, the terminal device stores current indication information or scheduling information, and sends or receives the service data at a same time-frequency resource location at every fixed time interval.

Optionally, the second downlink data is unicast downlink data or groupcast downlink data. When the second downlink data is unicast downlink data, the second DCI may also be referred to as unicast DCI, and the unicast DCI may be scrambled using an SPS-C-RNTI.

There are many manners of the second indication information in this embodiment of this application. The foregoing two manners are merely examples. This is not specifically limited herein.

Each piece of second feedback information in this embodiment of this application includes second NACK information or second ACK information of the second downlink data. The second NACK information indicates that the terminal device does not correctly receive the second downlink data. The second ACK information indicates that the terminal device correctly receives the second downlink data. This is equivalent to that the terminal device sends the second ACK information to the network device if the terminal device correctly receives the second downlink data, and that the terminal device sends the second NACK information to the network device if the terminal device does not correctly receive the second downlink data.

In this embodiment of this application, that the terminal device does not correctly receive data (the first downlink data or the second downlink data) may be that the terminal device fails to descramble the data, or may be that a channel (for example, a PDSCH) carried in the data is incorrectly decoded. Incorrect receiving in actual application may have another meaning. This is not limited herein.

203. The network device sends the first downlink data to the terminal device. The network device sends the first downlink data to the terminal device based on the first indication information, and the terminal device receives the first downlink data in a corresponding slot based on the first indication information Optionally, the first downlink data is groupcast downlink data.

204. The network device sends at least one piece of second downlink data to the terminal device. The network device sends the second downlink data to the terminal device based on the second indication information, and the terminal device receives the second downlink data in a corresponding slot based on the second indication information.

The at least one piece of second downlink data in this embodiment of this application may include a plurality of pieces of unicast downlink data, a plurality of pieces of groupcast downlink data, or at least one piece of unicast downlink data and at least one piece of groupcast downlink data. This is not specifically limited herein.

205. The terminal device determines a target PUCCH resource when a first condition is met.

The first condition in this embodiment of this application includes one or more of the following plurality of cases. The following separately describes the cases.

Case 1: The first condition includes that the first PUCCH resource overlaps the second PUCCH resource.

That the first PUCCH resource overlaps the second PUCCH resource in this embodiment of this application may be: Time-domain resources occupied by a first PUCCH and a second PUCCH are completely the same, or time-domain resources occupied by the first PUCCH and the second PUCCH partially overlap.

Optionally, the first condition includes that time-domain symbols occupied by the first PUCCH resource overlap time-domain symbols occupied by the second PUCCH resource.

Figure 5:
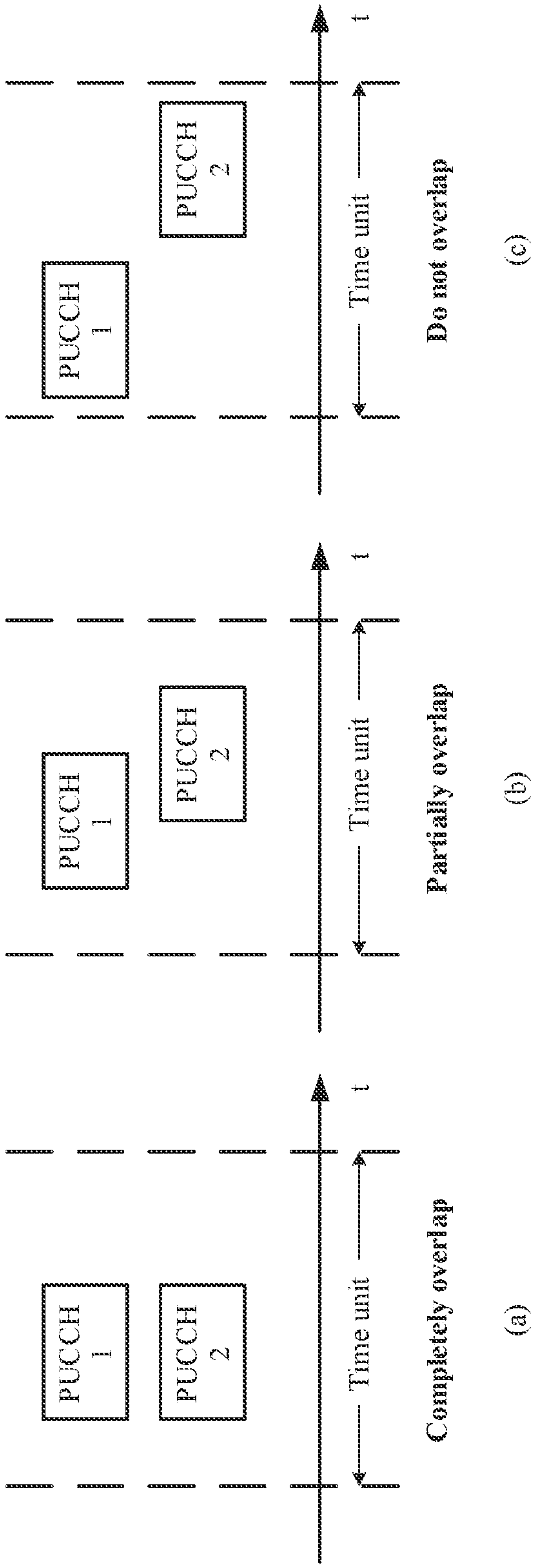
FIG. 5 is a schematic diagram of a first condition according to an embodiment of this application.

For example, (a) in FIG. 5 shows that time-domain resources occupied by the first PUCCH and the second PUCCH completely overlap; (b) in FIG. 5 shows that time-domain resources occupied by the first PUCCH and the second PUCCH partially overlap; and (c) in FIG. 5 shows that time-domain resources occupied by the first PUCCH and the second PUCCH do not overlap.

The terminal device determines the target PUCCH resource when the first condition is met. Specifically, the terminal device may determine that the second PUCCH resource is equivalent to the target PUCCH resource.

Case 2: The first condition includes that the first PUCCH resource and the second PUCCH resource are in a same time unit.

The same time unit in this embodiment of this application may be a subframe, a slot, a subslot, or another time-domain parameter (that is, another time-domain unit). This is not specifically limited herein. In this embodiment of this application, an example in which the time unit is a slot is used for description.

Figure 6:
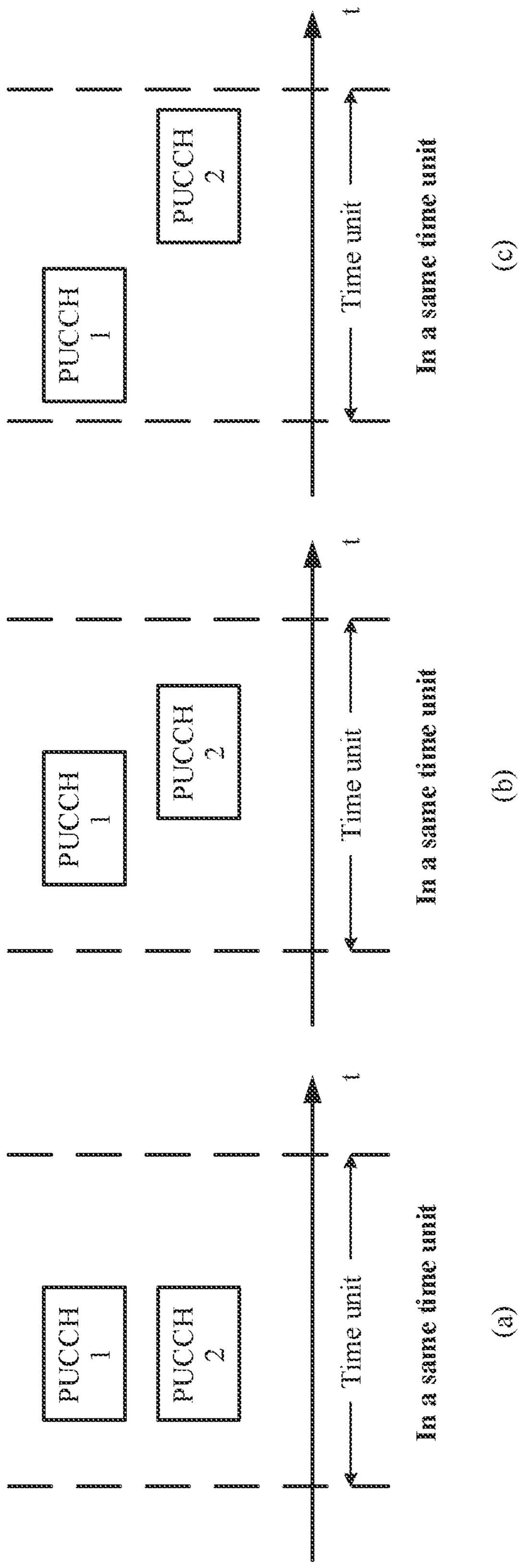
FIG. 6 is another schematic diagram of a first condition according to an embodiment of this application.

For example, (a), (b), and (c) in FIG. 6 all show that the first PUCCH resource and the second PUCCH resource are in a same time unit. It may be understood that FIG. 5(*c*) or FIG. 6(*c*) does not meet the first condition in Case 1, but meets the first condition in Case 2.

Figure 7A:
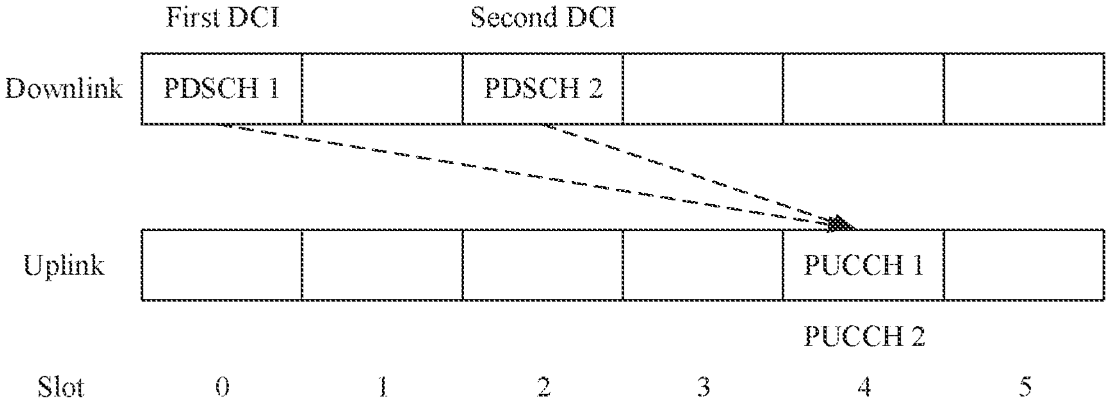
FIG. 7A is another schematic diagram of a first condition according to an embodiment of this application.

For example, as shown in FIG. 7A, the first DCI indicates the terminal device to receive, in a downlink slot 0, the first downlink data carried on a PDSCH 1, and indicates the terminal device to send, to the network device in an uplink slot 4, the first feedback information corresponding to the first downlink data. The first feedback information is carried on the PUCCH 1. The second DCI indicates the terminal device to receive, in a downlink slot 2, the second downlink data carried on a PDSCH 2, and indicates the terminal device to send, to the network device in the uplink slot 4, the second feedback information corresponding to the second downlink data. The second feedback information is carried on the PUCCH 2.

Case 3: The first condition includes that the first feedback information and the at least one piece of second feedback information are in a same time unit.

Figure 7B:
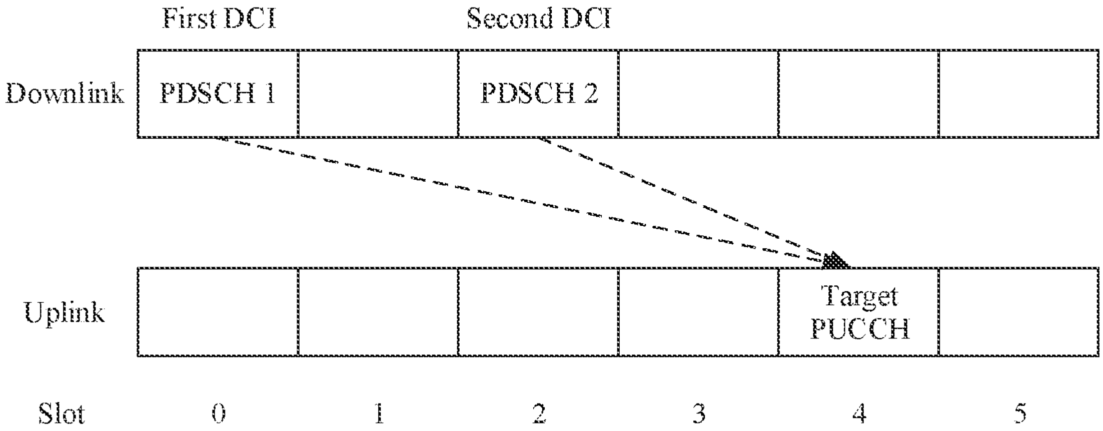
FIG. 7B is another schematic diagram of a first condition according to an embodiment of this application.

For example, as shown in FIG. 7B, the first DCI indicates the terminal device to receive, in a downlink slot 0, the first downlink data carried on a PDSCH 1, and indicates the terminal device to send, to the network device in an uplink slot 4, the first feedback information corresponding to the first downlink data. The second DCI indicates the terminal device to receive, in a downlink slot 2, the second downlink data carried on a PDSCH 2, and indicates the terminal device to send, to the network device in the uplink slot 4, the at least one piece of second feedback information corresponding to the at least one piece of second downlink data. Because both the first feedback information and the at least one piece of second feedback information are fed back in the uplink slot 4, the terminal device determines the target PUCCH in the uplink slot 4. The target PUCCH carries an acknowledgment codebook including third feedback information corresponding to the first downlink data and the at least one piece of second feedback information corresponding to the at least one piece of second downlink data. The third feedback information includes the first NACK information or the first ACK information. The second feedback information includes the second NACK information or the second ACK information.

Optionally, in this case, the first feedback information and the at least one piece of second feedback information have a same priority. In other words, in this case, the first condition may include: The first feedback information and the at least one piece of second feedback information are in a same time unit, and the first feedback information and the at least one piece of second feedback information have a same priority.

The priority may be determined based on an indication of a priority indicator field (for example, a "Priority Indicator field") in DCI, or may be determined based on a priority configured by RRC, or the like. In actual application, the priority of feedback information may be determined in another manner. For example, if a groupcast PDSCH is scrambled using a G-RNTI, a base station may configure the G-RNTI to associate with a priority, that is, determine the priority based on the G-RNTI of the groupcast PDSCH. A specific manner of determining the priority is not limited in this application.

There are many cases for the first condition in this embodiment of this application. The foregoing several cases are merely examples. This is not specifically limited herein.

Optionally, the first condition may further include that the terminal device correctly receives the first downlink data or that the terminal device does not correctly receive the first downlink data.

For ease of understanding of a specific process in which the terminal device determines a PUCCH resource (the first PUCCH resource, the second PUCCH resource, or the target PUCCH resource), the following describes several manners in which the terminal device determines a PUCCH resource.

1. The network device may configure one or more PUCCH resource sets for the terminal device by using radio resource control (radio resource control, RRC) signaling. The PUCCH resource set includes a plurality of PUCCH resources. There may be at least one of the following parameters for representing the PUCCH resource: a PUCCH resource index, a physical resource block (physical resource block, PRB) start index, a PRB start index after frequency hopping, an intra-slot frequency hopping indication, and a PUCCH format. The terminal device determines a PUCCH resource set based on a quantity of bits of feedback information, and determines a PUCCH resource from the PUCCH resource set based on a PUCCH resource indicator (PUCCH resource indicator, PRI) of DCI. Then, the terminal device sends the corresponding feedback information on the PUCCH resource.

2. The terminal device may directly determine, based on indication information sent by the network device, a PUCCH resource corresponding to feedback information.

It may be understood that the foregoing two are merely examples. In actual application, the terminal device may determine a PUCCH resource in another manner. For example, the terminal device determines a PUCCH resource, semi-persistent resource allocation, or dynamic resource allocation according to a preset rule. This is not specifically limited herein.

The first manner in which the terminal device determines a PUCCH resource is used as an example for description. The network device may configure one or more PUCCH resource sets (for example, one to four PUCCH resource sets) for the terminal device, and each of the PUCCH resource sets includes a plurality of PUCCH resources (for example, 8 to 32 PUCCH resources). Quantities of bits of uplink information that can be carried in the PUCCH resource sets may be different (for example, a PUCCH resource in a first PUCCH resource set may carry one to two bits, and quantities of bits corresponding to PUCCH resources in a second PUCCH resource set, a third PUCCH resource set, and a fourth PUCCH resource set are greater than 2).

Optionally, for a terminal device that does not establish an RRC connection to the network device, the terminal device may use a common PUCCH resource set, and determine resources in the common PUCCH resource set based on indication information.

Therefore, when the first condition is met, the terminal device may determine a target PUCCH resource set based on the third feedback information and a quantity of bits of the second feedback information. To be specific, the terminal device may determine a target PUCCH resource set based on a size (for example, a total quantity of bits of the third feedback information and the second feedback information) of the acknowledgment codebook, and then determine the target PUCCH resource from the target PUCCH resource set based on a PRI in indication information (the first indication information or the second indication information). The acknowledgment codebook includes the third feedback information corresponding to the first downlink data and the second feedback information corresponding to the at least one piece of second downlink data. The third feedback information includes the first NACK information or the first ACK information.

In an implementation of this embodiment of this application, the target PUCCH resource determined by the terminal is the second PUCCH resource.

In another implementation of this embodiment of this application, the target PUCCH resource determined by the terminal device is neither the first PUCCH resource nor the second PUCCH resource. Specifically, the target PUCCH resource is a resource independent of the second PUCCH resource.

206. The terminal device sends the acknowledgment codebook on the target PUCCH resource. Correspondingly, the network device receives the acknowledgment codebook on the target PUCCH resource.

After determining the target PUCCH resource, the terminal device sends the acknowledgment codebook to the network device on the target PUCCH resource. The acknowledgment codebook includes the third feedback information and the second feedback information.

There are a plurality of cases for the acknowledgment codebook in this embodiment of this application based on whether the terminal device correctly receives the first downlink data and/or the at least one piece of second downlink data. The following separately describes the cases.

1. When the terminal device correctly receives the first downlink data and also correctly receives all data in the at least one piece of second downlink data, the acknowledgment codebook includes the first ACK information and at least one piece of second ACK information.

2. When the terminal device correctly receives the first downlink data but does not correctly receive all data in the at least one piece of second downlink data, the acknowledgment codebook includes the first ACK information and the at least one piece of second NACK information.

3. When the terminal device correctly receives the first downlink data and correctly receives a part of the at least one piece of second downlink data, the acknowledgment codebook includes the first ACK information, second ACK information corresponding to the part of correctly received second downlink data, and second NACK information corresponding to a part of incorrectly received second downlink data.

4. When the terminal device does not correctly receive the first downlink data but correctly receives all data in the at least one piece of second downlink data, the acknowledgment codebook includes the first NACK information and at least one piece of second ACK information.

5. When the terminal device does not correctly receive the first downlink data and does not correctly receive all data in the at least one piece of second downlink data, the acknowledgment codebook includes the first NACK information and at least one piece of second NACK information.

6. When the terminal device does not correctly receive the first downlink data and correctly receives a part of the at least one piece of second downlink data, the acknowledgment codebook includes the first NACK information, second ACK information corresponding to the part of correctly received second downlink data, and second NACK information corresponding to a part of incorrectly received second downlink data.

207. The terminal device sends the first feedback information on the first PUCCH resource when a second condition is met. Correspondingly, the network device receives the first feedback information.

The second condition in this embodiment of this application corresponds to the first condition. There are a plurality of cases for the second condition in this embodiment of this application. The following separately describes the cases.

Case 1: The second condition includes that the first PUCCH resource does not overlap the second PUCCH resource.

That the first PUCCH resource does not overlap the second PUCCH resource in this embodiment of this application may be: Time-domain resources occupied by the first PUCCH and the second PUCCH are completely different. For example, the first PUCCH resource and the second PUCCH resource occupy different subframes, slots, subslots (or minislots), OFDM symbols, or the like.

For example, (c) in FIG. 5 shows that time-domain resources occupied by the first PUCCH and the second PUCCH do not overlap.

Optionally, the first feedback information and the at least one piece of second feedback information are in a same time unit, and the first feedback information and the at least one piece of second feedback information have different priorities. The first PUCCH carries the first feedback information, and the second PUCCH carries the at least one piece of second feedback information.

For descriptions of priority determining, refer to step 205. Details are not described herein again.

Case 2: The second condition includes that the first PUCCH resource and the second PUCCH resource are not in a same time unit.

Figure 8:
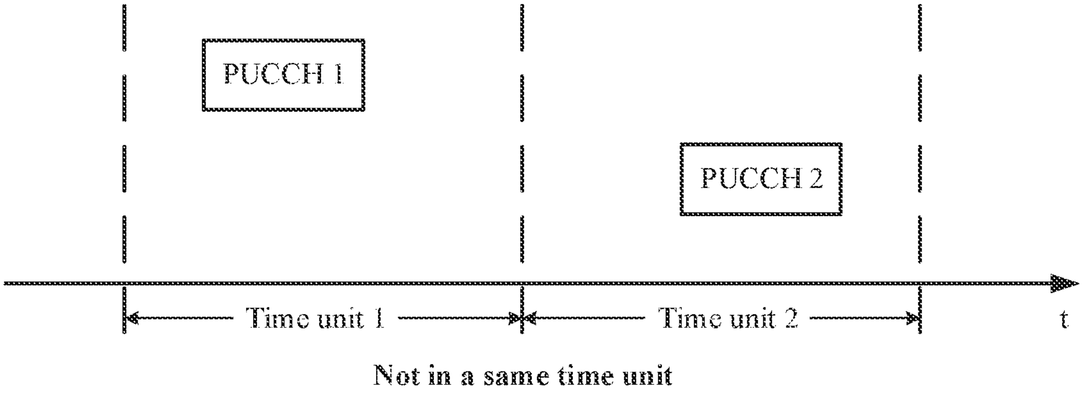
FIG. 8 is a schematic diagram of a second condition according to an embodiment of this application.

For example, as shown in FIG. 8, the first PUCCH is in a time unit 1, and the second PUCCH is in a time unit 2. In other words, the first PUCCH resource and the second PUCCH resource are not in a same time unit. For an example of the time unit, refer to the foregoing descriptions. Details are not described herein again.

There are many cases for the second condition in this embodiment of this application. The foregoing two cases are merely examples. This is not specifically limited herein.

When the second condition is met, the terminal device determines the first PUCCH resource, and sends the first feedback information to the network device on the first PUCCH resource.

Specifically, when the second condition is met, if the terminal device does not correctly receive the first downlink data, the terminal device sends the first NACK information to the network device on the first PUCCH resource.

A specific process in which the terminal device determines the first PUCCH resource is similar to the process in which the terminal device determines a PUCCH resource described in step 205. For ease of understanding, an example is described as follows: The network device configures one or more PUCCH resource sets for the terminal device by using RRC signaling. The terminal device determines a first PUCCH resource set from the one or more PUCCH resource sets based on a quantity of bits of the first feedback information (for example, a NACK), and then determines the first PUCCH resource from the first PUCCH resource set based on a PRI in the first indication information. Then, the terminal device sends the first feedback information to the network device on the first PUCCH resource.

When the second condition is met, the terminal device does not need to send the first ACK information to the network device if the terminal device correctly receives the first downlink data. If the network device does not receive the first ACK information, the network device determines that the terminal device has correctly received the first downlink data, so that an uplink resource occupied for feeding back the first ACK information can be saved.

208. The terminal device sends the at least one piece of second feedback information on the second PUCCH resource when the second condition is met. Correspondingly, the network device receives the at least one piece of second feedback information.

When the second condition is met, the terminal device determines the second PUCCH resource, and sends the at least one piece of second feedback information to the network device on the second PUCCH resource.

A specific process in which the terminal device determines the second PUCCH resource is similar to the process in which the terminal device determines a PUCCH resource described in step 205. For ease of understanding, an example is described as follows: The network device configures one or more PUCCH resource sets for the terminal device by using RRC signaling. The terminal device determines a second PUCCH resource set from the one or more PUCCH resource sets based on a quantity of bits of the second feedback information, and then determines the second PUCCH resource from the second PUCCH resource set based on a PRI in the second indication information. Then, the terminal device sends the second feedback information to the network device on the second PUCCH resource. This is equivalent to that, when the second condition is met, the terminal device sends the second ACK information to the network device on the second PUCCH resource if the terminal device correctly receives the second downlink data; or the terminal device sends the second NACK information to the network device on the second PUCCH resource if the terminal device does not correctly receive the second downlink data.

Optionally, the first PUCCH resource, the second PUCCH resource, and the target PUCCH resource (if the target PUCCH resource is not the second PUCCH resource) may be in a same PUCCH resource set, or may not be in a same PUCCH resource set. This is not limited in this embodiment of this application.

Optionally, the first PUCCH resource, the second PUCCH resource, and the target PUCCH resource (if the target PUCCH resource is not the second PUCCH resource) may overlap or do not overlap in frequency domain. This is not limited in this embodiment of this application.

In this embodiment of this application, when the first PUCCH resource overlaps the second PUCCH resource, or the first PUCCH resource and the second PUCCH resource are in a same time unit, the terminal device determines the target PUCCH resource, and sends the acknowledgment codebook to the network device on the target PUCCH resource. The first PUCCH resource carries the first feedback information corresponding to the first downlink data, and the first feedback information includes the first NACK information of the first downlink data but does not include the first ACK information. The second PUCCH resource carries the second feedback information corresponding to the at least one piece of second downlink data, and the second feedback information includes the second NACK information or the second ACK information. The acknowledgment codebook includes the second feedback information and the third feedback information, and the third feedback information includes the first ACK information or the first NACK information. When the first PUCCH resource does not overlap the second PUCCH resource, or the first PUCCH resource and the second PUCCH resource are not in a same time unit, the terminal device determines the first PUCCH resource, and sends the first feedback information to the network device on the first PUCCH resource. The terminal device determines the second PUCCH resource, and sends the second feedback information to the network device on the second PUCCH resource. When the first condition is met, the terminal device sends the acknowledgment codebook. This effectively resolves feedback conflict caused when the first PUCCH resource overlaps the second PUCCH resource, when the first PUCCH resource and the second PUCCH resource are in a same time unit, or when first feedback information and the at least one piece of second feedback information are in a same time unit. In addition, when the second condition is met, the terminal device performs feedback only when the first downlink data is incorrectly received. This saves uplink transmission resources and PUCCH resource configurations. Furthermore, the acknowledgment codebook includes the third feedback information and the second feedback information. This avoids inconsistency between a size of a fed-back acknowledgment codebook that is determined by the network device in the case in which the acknowledgment codebook includes the first feedback information and the second feedback information and a size of the acknowledgment codebook that is actually fed back by the terminal device. In this way, feedback determined by the network device is consistent with actual feedback of the terminal device.

A time sequence between the steps in this embodiment of this application is not limited. For example, step 203 may be performed before step 202, step 204 may be performed before step 203, step 207 may be performed before step 205 or step 206, and step 208 may be performed before step 205, step 206, or step 207 (where a sequence of performing step 206, step 207, and step 208 is not limited). In addition, this embodiment of this application may include only some steps. For example, an implementation of this embodiment of this application may include step 203, step 204, step 205, and step 206. An implementation of this embodiment of this application may include step 201, step 202, step 203, step 204, step 205, and step 206. Another implementation of this embodiment of this application may include step 201, step 202, step 203, step 204, step 207, and step 208. Another implementation of this embodiment of this application may include step 201 to step 208.

In correspondence to the methods provided in the foregoing method embodiments, embodiments of this application further provide corresponding apparatuses. The apparatus includes corresponding modules configured to perform the foregoing embodiment. The module may be software, hardware, or a combination of software and hardware.

Figure 9:
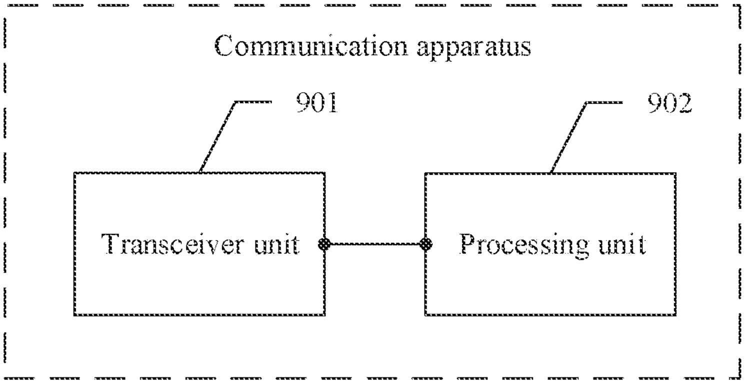
FIG. 9 to FIG. 12 are schematic diagrams of several structures of communication apparatuses according to embodiments of this application.

FIG. 9 shows an embodiment of a communication apparatus according to embodiments of this application. The communication apparatus may be a terminal device, or may be a component (for example, a processor, a chip, or a chip system) of the terminal device. The communication apparatus includes:

a transceiver unit 901, configured to receive first downlink data and at least one piece of second downlink data from a network device; and a processing unit 902, configured to determine a target physical uplink control channel PUCCH resource when a first condition is met. The first condition includes: A first PUCCH resource overlaps a second PUCCH resource, a first PUCCH resource and a second PUCCH resource are in a same time unit, or first feedback information corresponding to the first downlink data and at least one piece of second feedback information corresponding to the at least one piece of second downlink data are in a same time unit.

The first PUCCH resource carries the first feedback information corresponding to the first downlink data. The first feedback information includes first negative acknowledgment NACK information of the first downlink data but does not include first positive acknowledgment ACK information. The first NACK information indicates that the first downlink data is not correctly received, and the first ACK information indicates that the first downlink data is correctly received. The second PUCCH resource carries the at least one piece of second feedback information corresponding to the at least one piece of second downlink data. Each piece of second feedback information includes second NACK information or second ACK information. Each piece of second NACK information indicates that one of the at least one piece of second downlink data is not correctly received. Each piece of second ACK information indicates that one of the at least one piece of second downlink data is correctly received.

The transceiver unit 901 is further configured to send an acknowledgment codebook to the network device on the target PUCCH resource. The acknowledgment codebook includes third feedback information corresponding to the first downlink data and the at least one piece of second feedback information. The third feedback information includes the first NACK information or the first ACK information.

Optionally, the processing unit 902 is further configured to: when a second condition is met, determine to send the at least one piece of second feedback information on the second PUCCH resource. The second condition includes: The first PUCCH resource does not overlap the second PUCCH resource, or the first PUCCH resource and the second PUCCH resource are not in a same time unit.

Optionally, when the second condition is met and the first downlink data is not correctly received, the processing unit 902 is further configured to determine to send the first feedback information on the first PUCCH resource. The first feedback information is the first NACK information.

Optionally, when the second condition is met and the first downlink data is correctly received, the communication apparatus determines not to send the first ACK information.

Optionally, when the first condition is met and the first downlink data is not correctly received, the acknowledgment codebook includes the first NACK information and the at least one piece of second feedback information.

Optionally, when the first condition is met and the first downlink data is correctly received, the acknowledgment codebook includes the first ACK information and the at least one piece of second feedback information.

Optionally, the target PUCCH resource is the same as the second PUCCH resource.

Optionally, the transceiver unit 901 is further configured to receive first indication information from the network device, where the first indication information indicates the first PUCCH resource; and/or the transceiver unit is further configured to receive second indication information from the network device, where the second indication information indicates the second PUCCH resource.

In this embodiment, operations performed by the units in the communication apparatus are similar to the operations performed by the terminal device in embodiments shown in FIG. 2 to FIG. 8. Details are not described herein again.

In this embodiment, when the first condition is met, the processing unit 902 determines the target PUCCH resource, and the transceiver unit 901 sends the acknowledgment codebook to the network device on the target PUCCH resource. The first condition includes: The first PUCCH resource overlaps the second PUCCH resource, or the first PUCCH resource and the second PUCCH resource are in a same time unit. The first PUCCH resource carries the first feedback information corresponding to the first downlink data, and the first feedback information includes the first NACK information of the first downlink data but does not include the first ACK information. When the first condition is met, the transceiver unit 901 sends the acknowledgment codebook. This effectively resolves feedback conflict caused when the first PUCCH resource overlaps the second PUCCH resource or the first PUCCH resource and the second PUCCH resource are in a same time unit. In addition, when the second condition is met, the transceiver unit 901 performs feedback only when the first downlink data is incorrectly received. This saves uplink transmission resources and PUCCH resource configurations. Furthermore, the acknowledgment codebook includes the third feedback information and the second feedback information. This avoids inconsistency between a size of an acknowledgment codebook that is determined by the network device in the case in which the acknowledgment codebook includes the first feedback information and the second feedback information and a size of an acknowledgment codebook that is actually fed back by the terminal device. In this way, feedback determined by the network device is consistent with actual feedback of the terminal device.

Figure 10:
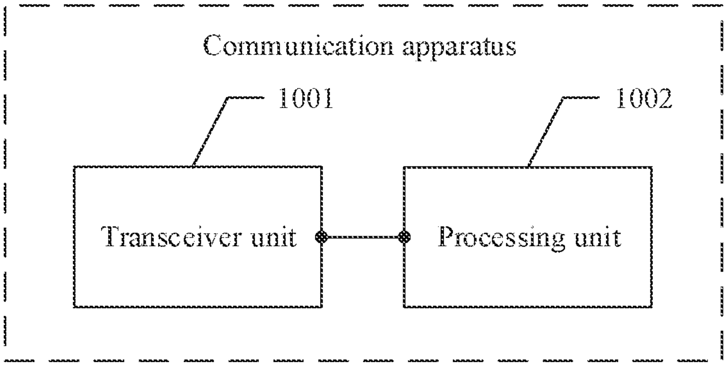

The following describes a network device in embodiments of this application. FIG. 10 shows another embodiment of a communication apparatus according to embodiments of this application. The communication apparatus may be a network device, or may be a component (for example, a processor, a chip, or a chip system) of the network device. The communication apparatus includes:

- a transceiver unit 1001, configured to send first downlink data and at least one piece of second downlink data to a terminal device; and
- a processing unit 1002, configured to determine a target physical uplink control channel PUCCH resource when a first condition is met. The first condition includes: A first PUCCH resource overlaps a second PUCCH resource, a first PUCCH resource and a second PUCCH resource are in a same time unit, or first feedback information corresponding to the first downlink data and at least one piece of second feedback information corresponding to the at least one piece of second downlink data are in a same time unit.

The first PUCCH resource carries the first feedback information corresponding to the first downlink data. The first feedback information includes first negative acknowledgment NACK information of the first downlink data but does not include first positive acknowledgment ACK information. The first NACK information indicates that the terminal device does not correctly receive the first downlink data, and the first ACK information indicates that the terminal device correctly receives the first downlink data. The second PUCCH resource carries the at least one piece of second feedback information corresponding to the at least one piece of second downlink data. Each piece of second feedback information includes second NACK information or second ACK information. Each piece of second NACK information indicates that the terminal device does not correctly receive one of the at least one piece of second downlink data. Each piece of second ACK information indicates that the terminal device correctly receives one of the at least one piece of second downlink data.

The transceiver unit 1001 is further configured to receive, on the target PUCCH resource, an acknowledgment codebook sent by the terminal device. The acknowledgment codebook includes third feedback information corresponding to the first downlink data and the at least one piece of second feedback information. The third feedback information includes the first NACK information or the first ACK information.

Optionally, the processing unit 1002 is further configured to: when a second condition is met, determine to receive the at least one piece of second feedback information on the second PUCCH resource. The second condition includes: The first PUCCH resource does not overlap the second PUCCH resource, or the first PUCCH resource and the second PUCCH resource are not in a same time unit.

Optionally, the transceiver unit 1001 is further configured to receive the first feedback information on the first PUCCH resource. The first feedback information is the first NACK information.

Optionally, the processing unit 1002 is further configured to: if the transceiver unit does not receive the first NACK information sent by the terminal device, determine that the terminal device has correctly received the first downlink data.

Optionally, the acknowledgment codebook includes the first NACK information and the at least one piece of second feedback information.

Optionally, the acknowledgment codebook includes the first ACK information and the at least one piece of second feedback information.

Optionally, the target PUCCH resource is the same as the second PUCCH resource.

Optionally, the transceiver unit 1001 is further configured to send first indication information to the terminal device, where the first indication information indicates the first PUCCH resource; and/or the transceiver unit is further configured to send second indication information to the terminal device, where the second indication information indicates the second PUCCH resource.

In this embodiment, operations performed by the units in the communication apparatus are similar to the operations performed by the network device in embodiments shown in FIG. 2 to FIG. 8. Details are not described herein again.

In this embodiment, when the first condition is met, the processing unit 1002 determines the target PUCCH resource, and the transceiver unit 1001 receives, on the target PUCCH resource, the acknowledgment codebook that is sent by the terminal device and that combines the feedback information corresponding to the first downlink data and the feedback information corresponding to the second downlink data. When the first condition is met, the network device receives the acknowledgment codebook. This effectively resolves feedback conflict caused when the first PUCCH resource overlaps the second PUCCH resource or the first PUCCH resource and the second PUCCH resource are in a same time unit. In addition, when the second condition is met, when the network device does not receive feedback that the first downlink data is incorrectly received, the network device determines that the terminal device has correctly received the first downlink data. This reduces uplink resources and PUCCH resource configurations that are used by the terminal device to feed back the first ACK information. Furthermore, the acknowledgment codebook includes the third feedback information and the second feedback information. This avoids inconsistency between a size of an acknowledgment codebook that is determined by the network device in the case in which the acknowledgment codebook includes the first feedback information and the second feedback information and a size of an acknowledgment codebook that is actually fed back by the terminal device. In this way, feedback determined by the network device is consistent with actual feedback of the terminal device.

Figure 11:
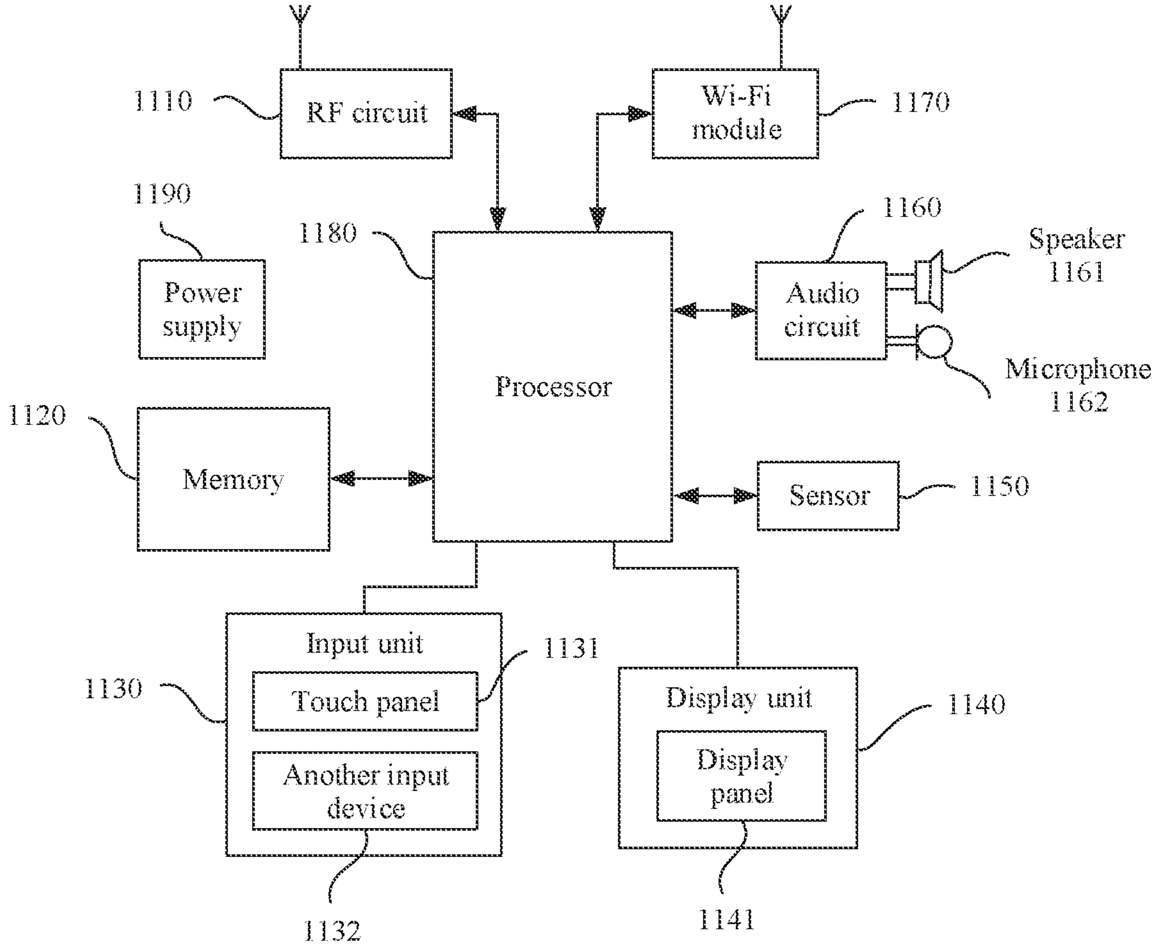

Refer to FIG. 11. An embodiment of this application provides another communication device. Specifically, the communication device may be a terminal device. For ease of description, only a part related to this embodiment of this application is shown. For specific technical details that are not disclosed, refer to the method part in embodiments of this application. The terminal device may be any terminal device including a mobile phone, a tablet computer, a personal digital assistant (personal digital assistant, PDA), a point of sales (point of sales, POS), a vehicle-mounted computer, or the like. For example, the terminal device is a mobile phone.

FIG. 11 shows a block diagram of a partial structure of a mobile phone related to the terminal device according to this embodiment of this application. Refer to FIG. 11. The mobile phone includes parts such as a radio frequency (Radio Frequency, RF) circuit 1110, a memory 1120, an input unit 1130, a display unit 1140, a sensor 1150, an audio circuit 1160, a wireless fidelity (wireless fidelity, Wi-Fi) module 1170, a processor 1180, and a power supply 1190. Persons skilled in the art may understand that a structure of the mobile phone shown in FIG. 11 constitutes no limitation on the mobile phone, and instead the mobile phone may include parts more or fewer than those shown in FIG. 11, or a combination of some parts, or different part arrangements.

The following describes the components of the mobile phone in detail with reference to FIG. 11.

The RF circuit 1110 may be configured to: receive and send a signal in an information receiving or sending process or a call process, and in particular, after receiving downlink information of a base station, send the downlink information to the processor 1180 for processing; and in addition, send designed uplink data to the base station. Generally, the RF circuit 1110 includes but is not limited to an antenna, at least one amplifier, a transceiver, a coupler, a low noise amplifier (Low Noise Amplifier, LNA), and a duplexer. In addition, the RF circuit 1110 may further communicate with a network and another device through wireless communication. The wireless communication may use any communication standard or protocol, including but not limited to a global system for mobile communications (Global System for Mobile communications, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Message Service, SMS), and the like.

The memory 1120 may be configured to store a software program and a module. The processor 1180 runs the software program and module stored in the memory 1120, to perform various functional applications and data processing of the mobile phone. The memory 1120 may mainly include a program storage area and a data storage area, where the program storage area may store an operating system, an application program required by at least one function (such as a voice playing function and an image playing function), and the like, and the data storage area may store data (such as audio data and a phone book) created according to use of the mobile phone, and the like. In addition, the memory 1120 may include a high-speed random access memory, and may further include a non-volatile memory, for example, at least one magnetic disk storage component, a flash memory component, or another volatile solid-state storage component.

The input unit 1130 may be configured to: receive entered digital or character information, and generate key signal input related to user setting and function control of the mobile phone. Specifically, the input unit 1130 may include a touch panel 1131 and another input device 1132. The touch panel 1131, also referred to as a touchscreen, may collect a touch operation (for example, an operation performed by a user on or near the touch panel 1131 by using any suitable object or accessory such as a finger or a stylus) performed by the user on or near the touch panel 1131, and may drive a corresponding connection apparatus based on a preset program. Optionally, the touch panel 1131 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch point coordinates, sends the touch point coordinates to the processor 1180, and receives and executes a command sent by the processor 1180. In addition, the touch panel 1131 may be implemented in a plurality of types, such as a resistive type, a capacitive type, an infrared type, and a surface acoustic wave type. The input unit 1130 may further include the another input device 1132 in addition to the touch panel 1131. Specifically, the another input device 1132 may include but is not limited to one or more of a physical keyboard, a function button (such as a volume control button or a power button), a trackball, a mouse, a joystick, and the like.

The display unit 1140 may be configured to display information entered by the user or information provided for the user, and various menus of the mobile phone. The display unit 1140 may include a display panel 1141. Optionally, the display panel 1141 may be configured in a form of a liquid crystal display (Liquid Crystal Display, LCD), an organic light-emitting diode (Organic Light-Emitting Diode, OLED), or the like. Further, the touch panel 1131 may cover the display panel 1141. When detecting a touch operation on or near the touch panel 1131, the touch panel 1131 transmits the touch operation to the processor 1180 to determine a type of a touch event, and then the processor 1180 provides corresponding visual output on the display panel 1141 according to the type of the touch event. In FIG. 11, the touch panel 1131 and the display panel 1141 are used as two independent parts to implement input and output functions of the mobile phone. However, in some embodiments, the touch panel 1131 and the display panel 1141 may be integrated to implement the input and output functions of the mobile phone.

The mobile phone may further include at least one sensor 1150 such as a light sensor, a motion sensor, and another sensor. Specifically, the light sensor may include an ambient light sensor and a proximity sensor. The ambient light sensor may adjust luminance of the display panel 1141 based on brightness of ambient light. The proximity sensor may turn off the display panel 1141 and/or backlight when the mobile phone approaches to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between a landscape mode and a vertical mode, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone. Details are not described herein.

The audio circuit 1160, a speaker 1161, and a microphone 1162 may provide an audio interface between the user and the mobile phone. The audio circuit 1160 may transmit, to the speaker 1161, an electrical signal that is obtained after conversion of received audio data, and the speaker 1161 converts the electrical signal into an acoustic signal and outputs the acoustic signal. In addition, the microphone 1162 converts a collected acoustic signal into an electrical signal, the audio circuit 1160 receives and converts the electrical signal into audio data, and outputs the audio data to the processor 1180 for processing, and then processed audio data is sent to, for example, another mobile phone, by using the RF circuit 1110, or the audio data is output to the memory 1120 for further processing.

Wi-Fi is a short-distance wireless transmission technology. The mobile phone may help, by using the Wi-Fi module 1170, the user receive and send an email, browse a web page, access streaming media, and the like. The Wi-Fi module 1170 provides wireless broadband internet access for the user. Although FIG. 11 shows the Wi-Fi module 1170, it may be understood that the Wi-Fi module 1170 is not a mandatory component of the mobile phone.

The processor 1180 is a control center of the mobile phone, connects various components of the entire mobile phone through various interfaces and lines, and executes various functions and processes data of the mobile phone by running or executing the software program and/or the module stored in the memory 1120 and invoking data stored in the memory 1120, to perform overall monitoring on the mobile phone. Optionally, the processor 1180 may include one or more processing units. Preferably, an application processor and a modem processor may be integrated into the processor 1180, where the application processor mainly processes an operating system, a user interface, an application program, and the like, and the modem processor mainly processes wireless communication. It can be understood that the modem processor may alternatively not be integrated into the processor 1180.

The mobile phone further includes the power supply 1190 (such as a battery) that supplies power to each part. Preferably, the power supply may be logically connected to the processor 1180 by using a power management system, so that functions such as management of charging, discharging, and power consumption are implemented by using the power supply management system.

Although not shown, a camera, a Bluetooth module, and the like may be included in the mobile phone. Details are not described herein.

In this embodiment of this application, the processor 1180 included in the terminal device may perform functions in embodiments shown in FIG. 2 to FIG. 8. Details are not described herein again.

Figure 12:
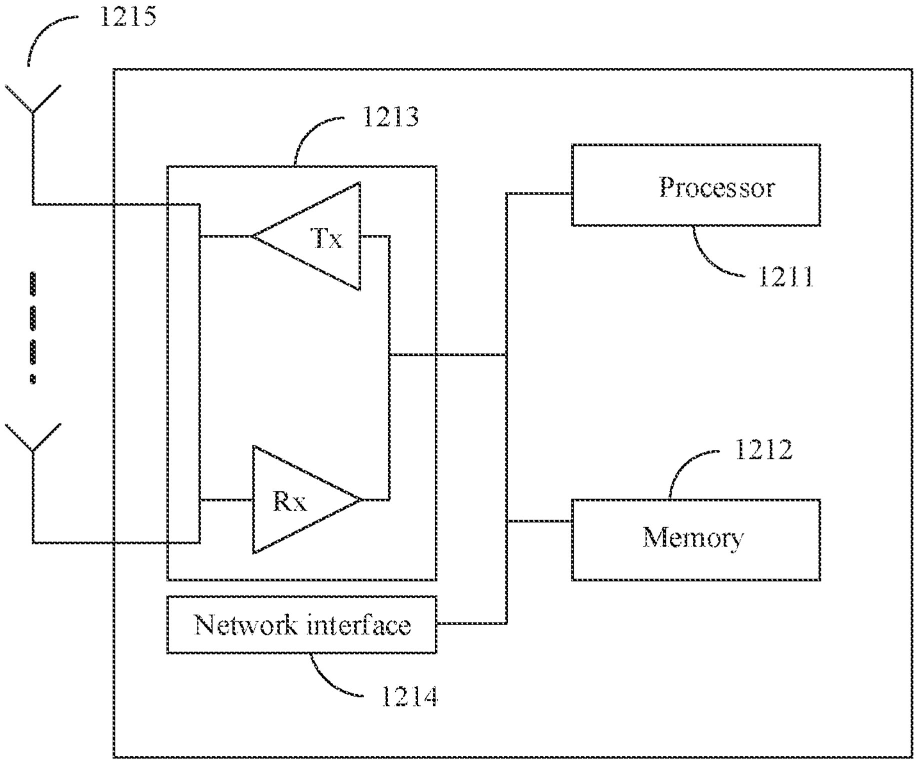

FIG. 12 is a schematic diagram of a structure of a communication apparatus in the foregoing embodiments according to an embodiment of this application. The communication apparatus may be specifically the network device in the foregoing embodiments. For a structure of the communication apparatus, refer to the structure shown in FIG. 12.

The communication apparatus includes at least one processor 1211, at least one memory 1212, at least one transceiver 1213, at least one network interface 1214, and one or more antennas 1215. The processor 1211, the memory 1212, the transceiver 1213, and the network interface 1214 are connected, for example, through a bus. In this embodiment of this application, the connection may include various interfaces, transmission lines, buses, or the like. This is not limited in this embodiment. The antenna 1215 is connected to the transceiver 1213. The network interface 1214 is configured to connect the communication apparatus to another communication device through a communication link. For example, the network interface 1214 may include a network interface between the communication apparatus and a core network device, for example, an Si interface. The network interface may include a network interface between the communication apparatus and another network device (for example, another access network device or a core network device), for example, an X2 interface or an Xn interface.

The processor 1211 is mainly configured to: process a communication protocol and communication data, control the entire communication apparatus, execute a software program, and process data of the software program. For example, the processor 1211 is configured to support the communication apparatus in performing an action described in the foregoing method embodiment. The communication apparatus may include a baseband processor and a central processing unit. The baseband processor is mainly configured to process the communication protocol and the communication data. The central processing unit is mainly configured to control an entire network device, execute the software program, and process the data of the software program. Functions of the baseband processor and the central processing unit may be integrated into the processor 1211 in FIG. 12. Persons skilled in the art may understand that the baseband processor and the central processing unit each may be an independent processor, and are interconnected by using a technology such as a bus. Persons skilled in the art may understand that the network device may include a plurality of baseband processors to adapt to different network standards, and the network device may include a plurality of central processing units to enhance processing capability of the network device, and components of the network device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the memory in a form of a software program. The processor executes the software program to implement a baseband processing function.

The memory is mainly configured to store the software program and data. The memory 1212 may exist independently, and is connected to the processor 1211. Optionally, the memory 1212 and the processor 1211 may be integrated, for example, integrated into a chip. The memory 1212 can store program code for executing the technical solutions in embodiments of this application, and the processor 1211 controls execution. Various types of executed computer program code may also be considered as drivers of the processor 1211.

FIG. 12 shows only one memory and one processor. In an actual network device, there may be a plurality of processors and a plurality of memories. The memory may also be referred to as a storage medium, a storage device, or the like. The memory may be a storage element located on a same chip as the processor, namely, an on-chip storage element, or an independent storage element. This is not limited in this embodiment of this application.

The transceiver 1213 may be configured to support receiving or sending of a radio frequency signal between the communication apparatus and a terminal, and the transceiver 1213 may be connected to the antennas 1215. The transceiver 1213 includes a transmitter Tx and a receiver Rx. Specifically, the one or more antennas 1215 may receive a radio frequency signal. The receiver Rx of the transceiver 1213 is configured to: receive the radio frequency signal from the antenna, convert the radio frequency signal into a digital baseband signal or a digital intermediate frequency signal, and provide the digital baseband signal or the digital intermediate frequency signal for the processor 1211, so that the processor 1211 further processes the digital baseband signal or the digital intermediate frequency signal, for example, performs demodulation processing and decoding processing. In addition, the transmitter Tx of the transceiver 1213 is further configured to: receive a modulated digital baseband signal or digital intermediate frequency signal from the processor 1211, convert the modulated digital baseband signal or digital intermediate frequency signal into a radio frequency signal, and send the radio frequency signal through the one or more antennas 1215. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

The transceiver may also be referred to as a transceiver unit, a transceiver apparatus, or the like. Optionally, a component that is in the transceiver unit and that is configured to implement a receiving function may be considered as a receiving unit. A component that is in the transceiver unit and that is configured to implement a sending function may be considered as a sending unit. That is, the transceiver unit includes the receiving unit and the sending unit. The receiving unit may also be referred to as a receiver, an input port, a receiver circuit, or the like. The sending unit may be referred to as a transmitter, a transmitter circuit, or the like.

It should be noted that the communication apparatus shown in FIG. 12 may be specifically configured to implement the steps implemented by the network device in the method embodiment corresponding to FIG. 2, and implement technical effects corresponding to the network device. For specific implementations of the communication apparatus shown in FIG. 12, refer to the descriptions in the method embodiment in FIG. 2. Details are not described herein again.

In the several embodiments provided in this application, it should be understood that the disclosed method, apparatus, and system may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the method described in embodiments of this application. The storage medium includes any medium such as a USB flash drive, a removable hard disk, a read-only memory (read-only memory, ROM), a random access memory (random access memory, RAM), a magnetic disk, or an optical disc, that can store program code. In the foregoing embodiments, descriptions of each embodiment have respective focuses. For a part that is not described in detail in an embodiment, refer to related descriptions in other embodiments.

Finally, it should be noted that the foregoing embodiments are merely intended for describing the technical solutions of embodiments of this application, but not for limiting this application. Although this application is described in detail with reference to the foregoing embodiments, persons of ordinary skill in the art should understand that they may still make modifications or replacements to the technical solutions described in the foregoing embodiments, without departing from the scope of the technical solutions of embodiments of this application.

What is claimed is:

1. A method, comprising:

receiving first downlink data and at least one piece of second downlink data from a network device, wherein the first downlink data are groupcast downlink data and the second downlink data are unicast downlink data;

in response to determining that a first condition is met:

determining a target physical uplink control channel (PUCCH) resource, wherein the first condition comprises:

a first PUCCH resource overlaps a second PUCCH resource, the first PUCCH resource and the second PUCCH resource are in a same time unit, or first feedback information corresponding to the first downlink data and at least one piece of second feedback information corresponding to the at least one piece of the second downlink data are in a same time unit, wherein the first PUCCH resource carries the first feedback information corresponding to the first downlink data, the first feedback information comprises first negative acknowledgment (NACK) information of the first downlink data when the first downlink data is not correctly received, but does not comprise first positive acknowledgment (ACK) information when the first downlink data is correctly received, the first NACK information indicates that the first downlink data is not correctly received, and the first ACK information indicates that the first downlink data is correctly received; and the second PUCCH resource carries the at least one piece of the second feedback information corresponding to the at least one piece of the second downlink data, each piece of the second feedback information comprises second NACK information or second ACK information, each piece of the second NACK information indicates that one of the at least one piece of the second downlink data is not correctly received, and each piece of the second ACK information indicates that one of the at least one piece of the second downlink data is correctly received; and sending an acknowledgment codebook to the network device on the target PUCCH resource, wherein the acknowledgment codebook comprises third feedback information corresponding to the first downlink data and the at least one piece of the second feedback information, and the third feedback information comprises the first NACK information when the first downlink data is not correctly received, or the first ACK information when the first downlink data is correctly received.

2. The method according to claim 1, wherein the method further comprises:

in response to determining that a second condition is met, determining to send the at least one piece of the second feedback information on the second PUCCH resource, wherein the second condition comprises: the first PUCCH resource does not overlap the second PUCCH resource, or the first PUCCH resource and the second PUCCH resource are not in a same time unit.

3. The method according to claim 2, wherein in response to determining that the second condition is met and the first downlink data is not correctly received, the method further comprises:

determining to send the first feedback information on the first PUCCH resource, wherein the first feedback information is the first NACK information.

4. The method according to claim 2, wherein in response to determining that the second condition is met and the first downlink data is correctly received, the method further comprises: determining not to send the first ACK information.

5. The method according to claim 1, wherein in response to determining that the first condition is met and the first downlink data is not correctly received, the acknowledgment codebook comprises the first NACK information and the at least one piece of the second feedback information.

6. The method according to claim 1, wherein in response to determining that the first condition is met and the first downlink data is correctly received, the acknowledgment codebook comprises the first ACK information and the at least one piece of the second feedback information.

7. The method according to claim 1, wherein the target PUCCH resource is the same as the second PUCCH resource.

8. The method according to claim 1, wherein the method further comprises at least one of:

receiving first indication information from the network device, wherein the first indication information indicates the first PUCCH resource; or receiving second indication information from the network device, wherein the second indication information indicates the second PUCCH resource.

9. The method according to claim 1, wherein the first condition comprises: the first feedback information and the at least one piece of the second feedback information are in a same time unit, and the first feedback information and the at least one piece of the second feedback information have a same priority.

10. A method, comprising:

sending first downlink data and at least one piece of second downlink data to a terminal device, wherein the first downlink data are groupcast downlink data and the second downlink data are unicast downlink data;

in response to determining that a first condition is met:

determining a target physical uplink control channel (PUCCH) resource, wherein the first condition comprises:

a first PUCCH resource overlaps a second PUCCH resource, the first PUCCH resource and the second PUCCH resource are in a same time unit, or first feedback information corresponding to the first downlink data and at least one piece of second feedback information corresponding to the at least one piece of the second downlink data are in a same time unit, wherein the first PUCCH resource carries the first feedback information corresponding to the first downlink data, the first feedback information comprises first negative acknowledgment (NACK) information of the first downlink data when the terminal device does not correctly receive the first downlink data, but does not comprise first positive acknowledgment (ACK) information when the terminal device correctly receives the first downlink data, the first NACK information indicates that the terminal device does not correctly receive the first downlink data, and the first ACK information indicates that the terminal device correctly receives the first downlink data; and the second PUCCH resource carries the at least one piece of the second feedback information corresponding to the at least one piece of second downlink data, each piece of the second feedback information comprises second NACK information or second ACK information, each piece of the second NACK information indicates that the terminal device does not correctly receive one of the at least one piece of the second downlink data, and each piece of the second ACK information indicates that the terminal device correctly receives one of the at least one piece of the second downlink data; and receiving, on the target PUCCH resource, an acknowledgment codebook sent by the terminal device, wherein the acknowledgment codebook comprises third feedback information corresponding to the first downlink data and the at least one piece of the second feedback information, and the third feedback information comprises the first NACK information when the terminal device does not correctly receive the first downlink data, or the first ACK information when the terminal device correctly receives the first downlink data.

11. The method according to claim 10, wherein the method further comprises:

in response to determining that a second condition is met, determining to receive the at least one piece of the second feedback information on the second PUCCH resource, wherein the second condition comprises: the first PUCCH resource does not overlap the second PUCCH resource, or the first PUCCH resource and the second PUCCH resource are not in a same time unit.

12. The method according to claim 11, wherein the method further comprises:

receiving the first feedback information on the first PUCCH resource, wherein the first feedback information is the first NACK information.

13. The method according to claim 11, wherein the method further comprises: in response to determining that the first NACK information is not received, determining that the terminal device has correctly received the first downlink data.

14. The method according to claim 10, wherein the acknowledgment codebook comprises the first NACK information and the at least one piece of the second feedback information.

15. The method according to claim 10, wherein the acknowledgment codebook comprises the first ACK information and the at least one piece of the second feedback information.

16. The method according to claim 10, wherein the target PUCCH resource is the same as the second PUCCH resource.

17. The method according to claim 10, wherein the method further comprises at least one of:

sending first indication information to the terminal device, wherein the first indication information indicates the first PUCCH resource; or sending second indication information to the terminal device, wherein the second indication information indicates the second PUCCH resource.

18. The method according to claim 10, wherein the first condition comprises: the first feedback information and the at least one piece of the second feedback information are in a same time unit, and the first feedback information and the at least one piece of the second feedback information have a same priority.

19. A communication apparatus, comprising:

at least one processor; and one or more memories coupled to the at least one processor and storing programming instructions for execution by the at least one processor to cause the communication apparatus to:

receive first downlink data and at least one piece of second downlink data from a network device, wherein the first downlink data are groupcast downlink data and the second downlink data are unicast downlink data;

in response to determining that a first condition is met:

determine a target physical uplink control channel (PUCCH) resource, wherein the first condition comprises:

a first PUCCH resource overlaps a second PUCCH resource, the first PUCCH resource and the second PUCCH resource are in a same time unit, or first feedback information corresponding to the first downlink data and at least one piece of second feedback information corresponding to the at least one piece of the second downlink data are in a same time unit, wherein the first PUCCH resource carries the first feedback information corresponding to the first downlink data, the first feedback information comprises first negative acknowledgment (NACK) information of the first downlink data when the first downlink data is not correctly received, but does not comprise first positive acknowledgment (ACK) information when the first downlink data is correctly received, the first NACK information indicates that the first downlink data is not correctly received, and the first ACK information indicates that the first downlink data is correctly received; and the second PUCCH resource carries the at least one piece of the second feedback information corresponding to the at least one piece of the second downlink data, each piece of the second feedback information comprises second NACK information or second ACK information, each piece of the second NACK information indicates that one of the at least one piece of the second downlink data is not correctly received, and each piece of the second ACK information indicates that one of the at least one piece of the second downlink data is correctly received; and send an acknowledgment codebook to the network device on the target PUCCH resource, wherein the acknowledgment codebook comprises third feedback information corresponding to the first downlink data and the at least one piece of the second feedback information, and the third feedback information comprises the first NACK information when the first downlink data is not correctly received, or the first ACK information when the first downlink data is correctly received.

20. A communication apparatus, comprising:

at least one processor; and one or more memories coupled to the at least one processor and storing programming instructions for execution by the at least one processor to cause the communication apparatus to:

send first downlink data and at least one piece of second downlink data to a terminal device, wherein the first downlink data are groupcast downlink data and the second downlink data are unicast downlink data;

in response to determining that a first condition is met:

determine a target physical uplink control channel (PUCCH) resource, wherein the first condition comprises:

a first PUCCH resource overlaps a second PUCCH resource, the first PUCCH resource and the second PUCCH resource are in a same time unit, or first feedback information corresponding to the first downlink data and at least one piece of second feedback information corresponding to the at least one piece of the second downlink data are in a same time unit, wherein the first PUCCH resource carries the first feedback information corresponding to the first downlink data, the first feedback information comprises first negative acknowledgment (NACK) information of the first downlink data when the terminal device does not correctly receive the first downlink data, but does not comprise first positive acknowledgment (ACK) information when the terminal device correctly receives the first downlink data, the first NACK information indicates that the terminal device does not correctly receive the first downlink data, and the first ACK information indicates that the terminal device correctly receives the first downlink data; and the second PUCCH resource carries the at least one piece of the second feedback information corresponding to the at least one piece of the second downlink data, each piece of the second feedback information comprises second NACK information or second ACK information, each piece of the second NACK information indicates that the terminal device does not correctly receive one of the at least one piece of the second downlink data, and each piece of the second ACK information indicates that the terminal device correctly receives one of the at least one piece of the second downlink data; and receive, on the target PUCCH resource, an acknowledgment codebook sent by the terminal device, wherein the acknowledgment codebook comprises third feedback information corresponding to the first downlink data and the at least one piece of the second feedback information, and the third feedback information comprises the first NACK information when the terminal device does not correctly receive the first downlink data, or the first ACK information when the terminal device correctly receives the first downlink data.

* * * * *